United States Patent [19]
Wolff et al.

[11] Patent Number: 5,657,403
[45] Date of Patent: Aug. 12, 1997

[54] VISION COPROCESSING

[75] Inventors: Robert Anthony Wolff, Millis; Steven Mark Rosenthal, Cambridge; William Michael Silver, Medfield; Jean-Pierre Schott, Cambridge, all of Mass.

[73] Assignee: Cognex Corporation, Natick, Mass.

[21] Appl. No.: 891,955

[22] Filed: Jun. 1, 1992

[51] Int. Cl.⁶ .................. G06K 9/54; G06K 9/60
[52] U.S. Cl. .............. 382/302; 382/303; 382/304; 382/308
[58] Field of Search .................. 382/41, 49, 27, 382/276, 302, 303, 304, 307, 308, 205; 395/502, 503, 504, 505, 506; 364/131, 132, 133, 134

[56] References Cited

U.S. PATENT DOCUMENTS

| | | | |
|---|---|---|---|
| 4,860,376 | 8/1989 | McCubbrey et al. | 382/41 |
| 4,972,359 | 11/1990 | Silver et al. | 364/728.05 |
| 5,046,190 | 9/1991 | Daniel et al. | 382/41 |
| 5,253,308 | 10/1993 | Johnson | 382/41 |

OTHER PUBLICATIONS

Bursky, "CMOS Four-Chip Set Processes Images at 20-MHz Data Rates", Electronic Design, May 28, 1987, pp. 39-44.

Plessey Semiconductors, Preliminary Information, May 1986, Publication No. PS 206.

*Primary Examiner*—Leo Boudreau
*Assistant Examiner*—Phuoc Tran
*Attorney, Agent, or Firm*—David J. Powsner

[57] ABSTRACT

A coprocessor in an image processing system is coupled to the bus to which a CPU and RAM holding image data are also coupled. The coprocessor extracts an input pixel stream corresponding to input images from selected bus transactions, performs computations on the input stream to produce output pixel streams corresponding to output images, and inserts the output pixel streams into selected CPU-to-memory bus transactions so that the memory stores the data. The CPU generates the selected bus transactions with specially marked address and/or control signals. The coprocessor includes a lookup table, and a first row delay. The row delay accumulates the three most recent rows of input pixels, which are sent to Sobel and rank processing sections for neighborhood processing. The results are thresholded and formatted, and are either output directly or passed through an additional pair of row delays to accumulate three rows of result data for neighborhood peak detection.

36 Claims, 26 Drawing Sheets

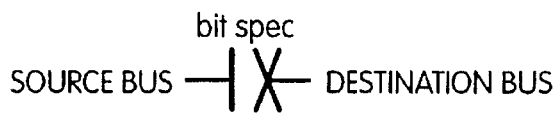
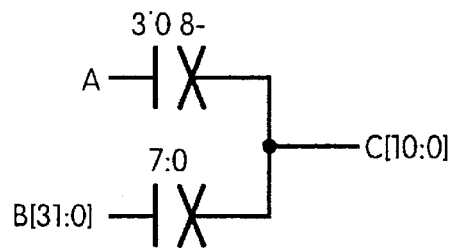
Fig. 17
Fig. 18
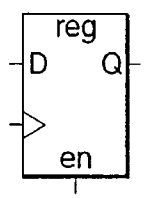
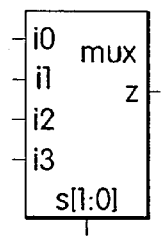
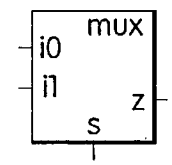
Fig. 19
Fig. 20A
Fig. 20B
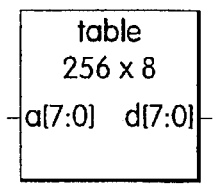
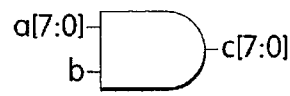
Fig. 21
Fig. 22
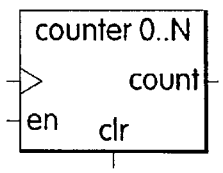
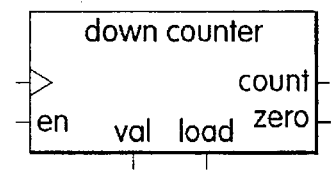
Fig. 23
Fig. 24
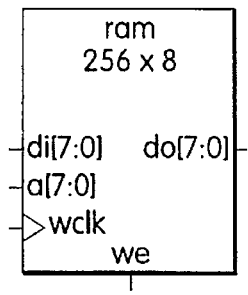
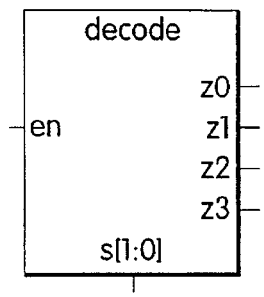
Fig. 25
Fig. 26

VISION COPROCESSING

FIELD OF THE INVENTION

This invention relates generally to image processing systems and particularly to coprocessing apparatus and methods for such systems.

BACKGROUND OF THE INVENTION

Machine vision is the aspect of industrial automation that deals with capturing images of objects with cameras, in digital form, and using the information in the image to guide industrial processes. Such devices are typically used to locate patterns for alignment, to measure distances, angles and other critical dimensions, to guide robots, to inspect the quality of manufactured items, and to identify unknown objects. The digital image processors upon which machine vision devices are built must perform a variety of computations rapidly, efficiently and inexpensively to be practical elements in industrial automation.

Image analysis systems extract information from raw or processed video images and generate information or decisions regarding the images. An earlier patent assigned to the assignee of this invention, U.S. Pat. No. 4,972,359, describes a coprocessor that provides certain image analysis computations efficiently.

Image processing systems manipulate the pixels of a raw video image through such processes as filtering, subtraction and rotation, and generate another, enhanced, image as output. The operations include grey scale morphology, grey scale edge detection, and rank value filtering.

Some of these functions are provided individually in the prior art by particular chips, such as a rank value filter available from LSI Logic as the L64220, a cartesian to polar conversion chip available from Plessey Semiconductors as the PDSP16330, and an edge detection chip available from Plessey Semiconductors as the PDSP16401.

The object of the invention is to combine and improve image processing devices and methods in a unique and efficient arrangement that provides great flexibility in responding to image processing needs, and that provides for a unique and efficient relationship with the rest of a machine vision system.

SUMMARY OF THE INVENTION

The invention provides a digital image processing system, including bus means for carrying control, data and address signals, memory means coupled to the bus means for storing digital image data and for responding to access control signals on the bus means for transferring digital image data therewith, CPU means coupled to the bus means for applying the access control signals for controlling the transfer of digital image data therewith, the CPU means including address means for applying address signals to the bus means, in connection with the access control signals, to locate data being transferred therewith, video input means coupled to the memory means for acquiring digital image data and for storing digital image data in the memory means, and image data co-processing means. The image data co-processing means are coupled to the bus means for responding to the control and address signals on the bus means for processing digital image data received therefrom, the address means including means for applying an address signal from a first selected set of address signals to the bus means in connection with an access control signal, the memory means including means for responding to that address signal for transferring data in accord with that access control signal, the image data co-processing means including means for responding to that address signal for ignoring data with the bus means, and the address means also including means for applying an address signal from a second selected set of address signals to the bus means in connection with an access control signal, the image data co-processing means including means for responding to that address signal for transferring digital image data to the bus means, the memory means including means for responding to that address signal for transferring data from the bus means for storage therein.

Preferably, the image data co-processing means includes at least one neighborhood processor for processing an input array of digital image data words to generate an output array of digital image data words, wherein the input array is no larger in a first principal dimension than NW pixels, and no larger in a second principal dimension normal to the first than NH pixels, where NW is no larger than an image width, IW. The neighborhood processor includes means for generating a word of output for each word of input and for generating each such word of output based on values of words in a neighborhood of the respective word of input, wherein the neighborhood comprises a plurality of digital image words corresponding to adjacent pixels in the corresponding acquired digital image data.

Furthermore, the image data or co-processing means includes buffer memory means for storing digital image words in an array of NH rows of IW columns, control circuits for storing into the buffer memory means one or more input words and simultaneously retrieving therefrom a neighborhood of NW by NH digital image data words, and computational elements for computing from the neighborhoods, one or more output digital image words representing at least a portion of the enhanced digital image data.

The neighborhood processor may include rank value filter means comprising input means for inputting a neighborhood of digital image data words, each said candidate digital image data word comprising a plurality of bits, from most significant to least significant bit, storage means for at least initially storing a predetermined rank of word to be selected from the plurality of candidate words, mask means for storing a mask associated with each of the input words, each mask being at least initially set to identify input words as candidate, iterative ranking means, coupled with the input, storage and mask means, for iteratively testing bits of the same significance from all of the candidate digital image data words, and generating a corresponding bit portion of a resultant digital word of the desired rank, and means for generating the resultant digital word as representative of the predetermined rank. The neighborhood processor may include grey scale morphology means comprising preprocessor means coupled to the input means for performing a selected mathematical function on an input neighborhood of digital image words to form a preprocessed neighborhood, in combination with the rank value filter means.

As discussed below, the neighborhood processor may additionally be configured for Sobel edge detection.

In another aspect of the invention, a digital image processing system is provided, including an image source means generating digital image data, image data co-processing means coupled to the image source means for processing digital image data received therefrom, and CPU means coupled to the image source means and to the image data co-processing means, for generating and applying thereto signals to control the transfer of rows of digital image data from the image source means to the image data co-processing means, each row comprising adjacent portions of an image along a first axis thereof, the rows being either successive rows of a single image or single corresponding rows of successive images, and control the processing of the rows by the image data co-processing means. The image data co-processing means includes input means for inputting the rows of digital image data, row delay means coupled to the input means for accumulating rows of data, the accumulated rows being either successive rows of a single image or single corresponding rows of successive images, neighborhood processing means coupled to the row delay means for responding to control signals received from the CPU means to selectively process rows of a single image received therefrom, row processing means coupled to the row delay means for responding to control signals received from the CPU to selectively process the single rows of successive images, and means coupled to the neighborhood and row processing means for selectively transferring processed image data therefrom. Preferably, the image source means and the image data co-processing means are both coupled to a bus means, and the neighborhood processing means and row processing means comprise reconfigurable processing means selectively actuable in response to control signals from the CPU to process successive rows from the same image or single rows of successive images.

The invention may also be viewed as a digital image processing apparatus having a programmable computational element, a random access memory, a bus for carrying address, data and control signals, input circuits capable of acquiring digital input images and storing them in memory, and a pixel processor operatively connected to the bus. The pixel processor has extracting means for extracting an input pixel stream corresponding to the images from selected bus transactions that are specially marked by certain address and/or control signals reserved for that purpose, performing means for performing some computation on the input pixel stream to produce output pixel streams corresponding to output images wherein each output value is some function of one or more input values, and inserting means for inserting first output pixel streams into selected computational element-to-memory bus transactions that are specially marked by certain address and/or control signals reserved for that purpose and in such a way that the memory stores the data supplied by the pixel processor, the computational element having means to generate the selected bus transactions with the specially marked signals, so that said transactions are of such a type and in such a sequence to correspond to the pixels in the input and the output images.

The pixel processor may include a first neighborhood processor or a first row processor. It may also include a second neighborhood processor. The first neighborhood processor may be configured for Sobel cartesian gradient computation, for Sobel polar gradient computation, or for gauss/laplace. The first row processor may be configured as a pixel rank processor, or for the summation or subtraction of two input pixel streams. The second neighborhood processor may be configured for peak detection. The pixel processor may also include a formatter.

The invention provides, in still other respects, methods for processing images in digital data form in the manner of the apparatus described above.

DESCRIPTION OF DRAWINGS

Other objects, features and advantages of the invention will be described in, or be seen as inherent in, the following description of a preferred embodiment of the invention, including drawings thereof, in which:

FIG. 17 illustrates the bus rewiring symbol used in the schematics of the figures;

FIG. 18 illustrates multiple bus rewiring elements;

FIG. 19 is a illustration of the register symbol used in the schematics;

FIGS. 20a and 20b are illustrations of multiplexer symbols used in the schematics;

FIG. 21 is an illustration of a table RAM symbol used in the schematics;

FIG. 22 is an illustration of gate cardinality as used in the schematics;

FIG. 23 is an illustration of a counter symbol used in the schematics;

FIG. 24 is an illustration of a down counter symbol used in the schematics;

FIG. 25 is an illustration of a RAM symbol used in the schematics;

FIG. 26 is an illustration of a decoder symbol used in the schematics;

DESCRIPTION OF THE PREFERRED EMBODIMENT

Functional Overview

The coprocessor described herein is an image processing integrated circuit designed for image processing systems. The VC-2, as it will be referred to in the description, provides efficient Sobel edge detection and greyscale morphology operations, along with some additional functions. This section describes the fundamental functional capabilities of VC-2.

Figure 1:
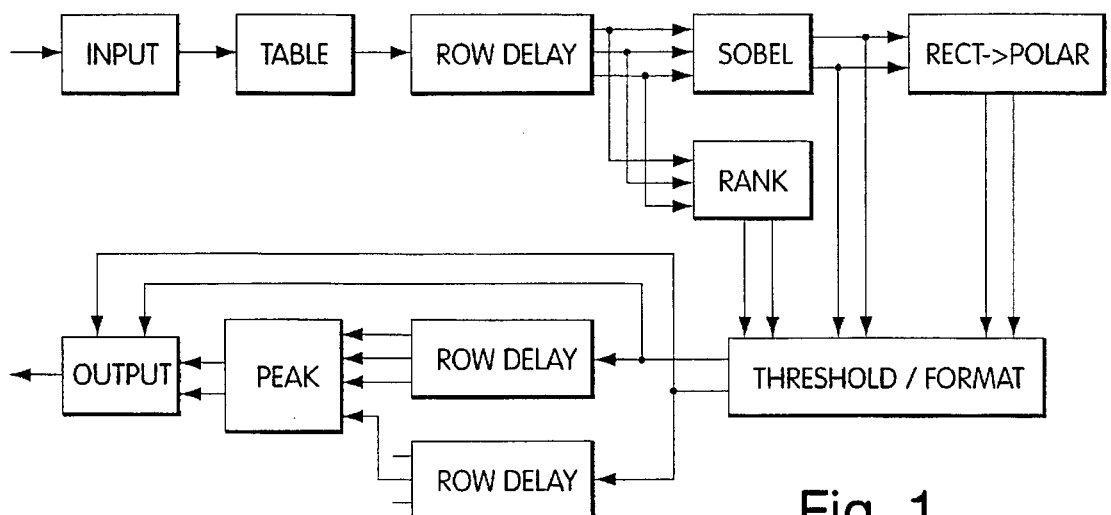
FIG. 1 is a block diagram of the pixel processing path of the invention.

Before listing some of VC-2's individual functions, a simplified functional block diagram is presented, and VC-2 capabilities common to many or all processing modes are discussed. FIG. 1 is such a diagram, showing the VC-2's pixel processing path.

When pixels are input into VC-2, they are transformed by a lookup table and fed into the first row delay. The row delay accumulates the three most recent rows of input pixels, which are sent to the Sobel and Rank processing sections for neighborhood processing. The results are thresholded and formatted, and are either output directly, or passed through an additional pair of row delays (one for each output image) to accumulate three rows of result data for neighborhood peak detection.

All VC-2 operations take as input one, two, or three input images and produce one or two output, images, called A and B. The images are all of the same dimensions, with each pixel in each output image being a function of an up to 3×3 neighborhood of the corresponding pixel in the input image (s).

All images handled by VC-2 are 8 bit images, stored in memory as one pixel per byte. Input image pixels are always treated as unsigned integers, but output image pixels are signed (8 bit two's complement) or unsigned depending on the processing mode. In some of the discussions below, references are made to X and Y image axis directions. In VC-2, these are defined with respect to the order in which pixels are input to the chip, as follows: The first pixel of a row has the lowest X coordinate, and the first row of an image has the highest Y coordinate. Thus, with respect to CRT raster scanning, X increases toward the right of the image, and Y increases toward the top of the image.

Figure 2:
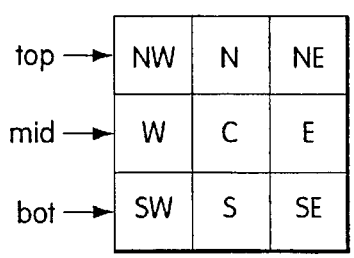
FIG. 2 is an illustration of labelling of a 3×3 pixel neighborhood.

In discussing 3×3 pixel neighborhoods, it is sometimes useful to label individual cells or rows of the neighborhood. This is done as shown in FIG. 2.

Because of VC-2's nature as an image processor, it is possible to provide a small set of software routines for accessing VC-2. These routines are collectively referred to as the VC-2 driver software.

The VC-2 driver software includes routines for setting up the VC-2 processing mode and loading its lookup table. In addition, the VC-2 driver software will provide routines for efficiently streaming one, two or three input images into VC-2, obtaining one or two output images, all in a manner consistent with VC-2's configured processing mode.

In all modes, a fully programmable pixel translation table (256×8) is provided to allow input image pixels to be arbitrarily mapped before processing by the rest of VC-2. The table can be optionally bypassed, under control of a bit in a VC-2 control register. In the case of multiple input image functions, the table can be bypassed on a per-input image basis.

In all modes, each output A value is compared to a programmable threshold, and is replaced by 0 if its absolute value is smaller than the threshold value. Whenever an A value is zeroed because of thresholding, the corresponding B value is also zeroed. Note that a value of zero may be specified for the threshold, effectively disabling this feature.

In all modes, the A data and B data are subject to programmable formatting. The A and B data magnitudes may be scaled and/or clamped. Signed quantities can optionally be converted to unsigned quantities (by taking the absolute value, or by replacing negative values with zero).

In all single input image modes, an optional peak detection capability is available to post-process the formatted A and B output images before they are output. Peak detection is not available for multiple input image modes.

In peak detection, 4-pixel neighborhoods of the A output image are evaluated to determine if the center pixel is a peak. If so, the A center pixel and corresponding B pixel are output without modification. However, if the A pixel is not a peak, zero is substituted for both the A pixel and the corresponding B pixel.

For the peak detection mode just described, there are four selectable peak criteria, corresponding to whether the center pixel is a peak in the vertical axis, horizontal axis, either axis, or both axes. In all cases, the peak function is asymmetric: for the horizontal axis, the center pixel is a peak if its value is greater than its left neighbor and greater than or equal to its right neighbor; for the vertical axis, the center pixel must be greater than the bottom pixel and greater than or equal to the top pixel to be considered a peak. In this section, some of the VC-2 functions that operate on a single input image are described.

These functions act on a 3×3 neighborhood of each input pixel. At the boundaries of the image, therefore, the functions are not well defined. If peak detection is used, the output instead depends on parts of a 5×5 neighborhood of each input pixel, causing the outputs to be ill-defined for a two pixel thick boundary of the input image. One way of dealing with this would be to write zero values into the corresponding border pixels of the output image(s).

Figure 3:
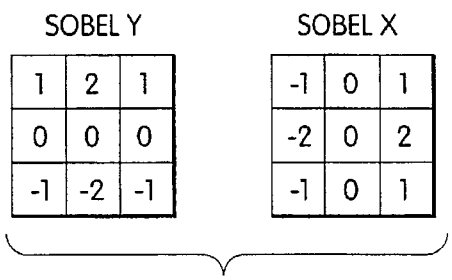
FIG. 3 is an illustration of Sobel operators for a 3×3 neighborhood.

The Sobel rectangular function convolves the input image with the Sobel edge operators illustrated in FIG. 3. The A output is the Sobel Y gradient, and the B output the Sobel X gradient. Both are signed quantities on the range [−1020 . . . 1020] (the maximal value, 1020, is 4 times 255, the maximal pixel value). The Formatter block converts the results to 8 bits in a configurable manner.

In the Sobel polar mode, the Sobel X and Y gradients are computed and converted to magnitude and angle results approximately as follows:

$$m = 1.164 \; (X^2 + Y^2)^{1/2}$$

$$a = \mathrm{atan}\,(y, x)$$

(The 16% "surplus" in the magnitude result is an artifact of VC-2's technique for converting the rectangular Sobel vector to polar form.)

The magnitude is rounded to a 10 bit unsigned value and clamped to a maximum value of 1023. The Formatter block converts this value to 8 bits in a configurable fashion.

The angle is a four-quadrant value, based on the signs of the X and Y gradients. VC-2 calculates the angle value as an 8 bit integer, where 0 represents 0 degrees, and 255 represents approximately 358.6 degrees.

The formatter can be configured to leave the angle format untouched, or to left-shift the angle by one bit, discarding the upper bit. The latter option causes edge polarity to be disregarded, since the discarded upper bit represented 180 degrees (after the shift, the new upper bit has a weight of 90 degrees).

Then, if the formatted angle is 0, it is coerced to 1 or 255, depending on the sign of the Sobel Y gradient. The modified angle result is then subject to the result of optional thresholding and optional peak detection of the magnitude result. As a result of this, the only way an angle value will be zero is if the corresponding magnitude value fails the threshold or peak detect tests.

Figure 4:
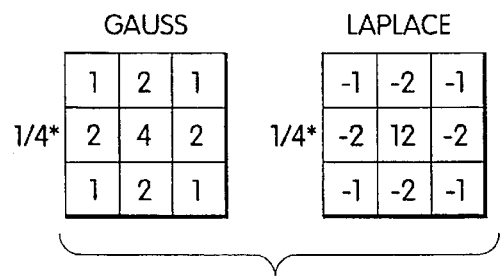
FIG. 4 is an illustration of Gauss and Laplace operators for 3×3 neighborhoods.

In the Gauss/Laplace mode, the input image is convolved with the two operators shown in FIG. 4. The A output is the Gaussian, and is truncated to an unsigned value on the range [0 . . . 1020]. The B output is the Laplacian, and is truncated to a signed value on the range [−765 . . . 765]. The Formatter block converts the results to 8 bits in a configurable manner.

Figure 5:
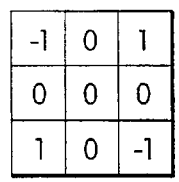
FIG. 5 is an illustration of quadratic variation operators for 3×3 neighborhood.

The quadratic variation function is the convolution of the input image with the operator shown in FIG. 5. The A output is the quadratic variation, and is a signed value on the range [−510 . . . 510]. The Formatter block converts the result to 8 bits in a configurable manner. As an artifact of the implementation, the B output is the Sobel X gradient.

In the rank value filter mode, the pixels in a 3×3 neighborhood (or a configurable subset thereof) Of each input image pixel are ranked, and the value of the pixel of specified rank is output as the output image A value. The rank may be specified as the minimum value, maximum value, or any rank value in between, such as the median. The A output value is 8 bits unsigned, being simply the value of one of the input pixels. As an option, the A value can be forced to zero unless the ranking pixel value was present in the center of the neighborhood. This feature can be used, for example, to implement hill climbing, outputting zero unless the center pixel is the maximum value of its 3×3 neighborhood. The B value is a bitmap indicating which pixel(s) of the neighborhood held the selected rank value. One of three methods may be chosen to convert the raw 9 element bitmap to the 8 bit B value.

Greyscale morphology is essentially the same as rank value filtering, with the addition of a preprocessing step. In greyscale morphology, a 3×3 set of header values is added to the 3×3 pixel neighborhood, forming a modified 3×3 pixel neighborhood which is then processed by rank value filtering to find the minimum or maximum. Each of the nine header values is independently programmable to values on the range [−256 . . . 255]. The input pixel values are treated as 8 bit unsigned; when a header value is added to a pixel value, the result is clamped to [0 . . . 255].

In this section, some of the VC-2 functions that operate on two or more input images are described. Up to three input images may be accommodated; these are labelled Top, Mid, and Bot.

When VC-2 is processing multiple input images, each pixel of the output image(s) is a function of the corresponding pixels in the input images. No neighborhoods are used, so border pixels are not a concern.

In the image addition mode, each output A pixel is the sum of the corresponding pixels in the two input images. The 9 bit sum is converted to 8 bits by the Formatter block either by dividing by two and truncating, or by taking the lower 8 bits and setting the result to 255 if the uppermost bit was not zero.

In the image accummulation mode, an 8 bit image is added to a 16 bit image, producing a 16 bit result image. Overflow of a result pixel beyond 16 bits is not detected. For this mode, a 16 bit image is handled as two 8 bit images, a high order image and a low order image. Corresponding pixels of the two images, taken together, constitute the 16 bit pixel values.

In the image subtraction mode, each output A pixel is the difference of the corresponding pixels in the two input images. Before formatting, the difference values are on the range [−255 . . . 255]. The Formatter block converts these values to 8 bits in several configurable ways, including absolute value, clamping negative values to zero, linear scaling, and clamping to [−127 . . . 127].

In the Golden Template Comparison mode, three input images are processed pixel-by-pixel according to the GTC formula:

$$GTC\,(I, M, T) = |I - M| - T$$

In the equation, I, M, and T represent corresponding pixels of the image, template, and threshold images, respectively, and the formula indicates how the corresponding result pixel is derived.

The result is on the range [−255 . . . 255], and is carried on the A output, the same as in image subtraction.

The constant threshold GTC mode is similar to Golden Template Comparison, except only two inputs (image and template) are processed, and the T term in the equation is replaced with a programmable 8 bit constant.

In the image masking mode, one of the input images has pixel values 0 or 255 (or its pixels are all mapped to 0 and 255), and is used to mask the other input image. If a mask pixel is 255, the corresponding pixel in the A output image is set from the corresponding pixel in the other (non-mask) input image; if the mask pixel is zero, the corresponding output pixel is zeroed.

In the image MAX/MIN mode, corresponding pixels of two input images are compared, and the output A result set to the maximum or minimum (whichever is selected) of the two values.

In the image comparison mode, corresponding pixels of two input images are compared, and the output B result set to one of three values corresponding to whether one input pixel was less than, equal to, or greater than the other. Note that this mode and the image MAX/MIN mode (2.9.7) are really the same mode, with the MAX/MIN value occurring in the A output and the comparison result in the B output.

System Architecture

This section looks at the internal architecture of VC-2, and discusses how VC-2 operates in the context of an image processing system.

Figure 6:
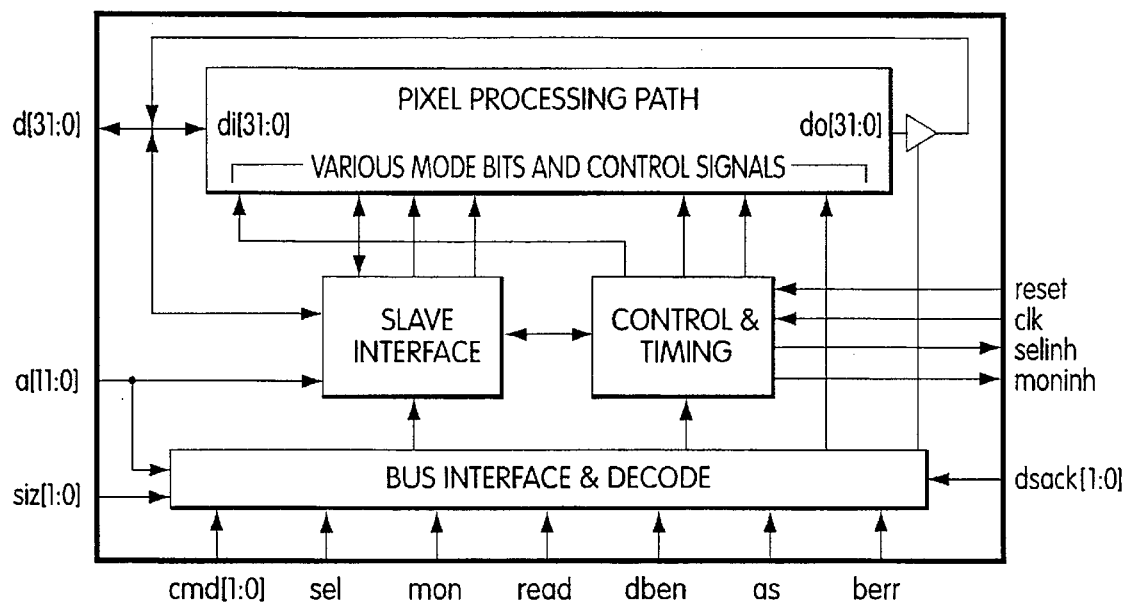
FIG. 6 is a diagrammatic representation of the internal architecture of the invention.

FIG. 6 is a simplified view of VC-2. The Bus Interface & Decode block recognizes and responds to slave access cycles, bus monitor inputs, and bus monitor outputs.

The Slave Interface block contains read/write registers that contain various mode bits and configuration values that control the behavior of the Pixel Processing Path. In addition, the Slave Interface block provides slave access to the lookup table memory, and allows some state of the Pixel Processing Path to be controlled via slave cycles.

The Control & Timing section coordinates activity in the chip. It controls the capture of data and advancement of the Pixel Processing Path pipeline in response to bus monitor inputs, and provides synchronization among bus monitor inputs and slave cycles.

From a functional perspective, the Pixel Processing Path is the heart of VC-2. The rest of this section presents a discussion of slave access and bus monitor input/output operation.

Figure 7:
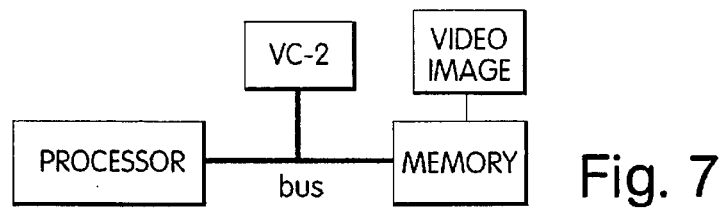
FIG. 7 is a highly simplified diagram of the invention in an image processing system.

FIG. 7 is a simplified view of VC-2 in an image processing system.

In the diagram of FIG. 7, many components of a real image processing system are omitted for simplicity, leaving only those elements essential to Understanding VC-2's role in the system. In particular, the distinction between video memory and main memory is omitted (VC-2 works with both kinds of memory), and other coprocessors are not illustrated.

Figure 8:
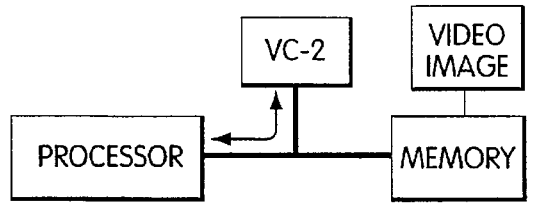
FIG. 8 is a diagram like that of FIG. 7 illustrating slave access to the coprocessor of the invention.

In a slave access (see FIG. 8) to VC-2, the processor reads and writes registers and memory within VC-2 using ordinary read and write bus cycles. Only VC-2 responds; no other peripherals or memory in the image Processor are involved. Slave access to VC-2 is necessary to configure the VC-2 processing mode, by writing appropriate values into internal VC-2 registers. Slave access is also used to set the contents of the pixel translation table. In addition, some simple diagnostics can be performed via slave reads and writes.

Figure 9:
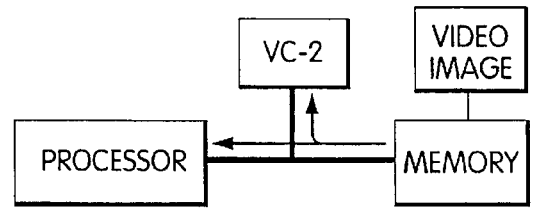
FIG. 9 is a diagram like that of FIG. 7 illustrating bus monitor input.

As shown in FIG. 9, the processor causes pixels to be input to VC-2 by reading the pixels from memory using specially tagged addresses. VC-2 recognizes the address tag and captures the memory-supplied pixel data from the bus. If the processor reads data from memory without using specially tagged address values, VC-2 ignores the transfer. Thus, the processor has complete control over which pixels are processed by VC-2, and in what order. Note that bus monitor inputs can also be accomplished by having the processor write to memory with the specially tagged address values (this is not illustrated). In this case it is the processor, rather than the memory, that supplies the pixel values to VC-2.

A bus monitor input cycle is signalled by assertion of mon while cmd[1:0]=1. If the moninh output is asserted, this means that VC-2 is still processing pixels from the previous bus monitor input, and the board logic should insert wait states until moninh goes away.

When one or both of dsack[1:0] are asserted during a bus monitor input, VC-2 captures the contents of the data bus, and also latches the state of a[1:0], siz[1:0], and dsack[1:0]. The values of a[1:0] and siz[1:0] identify the size and alignment of the requested bus transfer, and dsack[1:0] identifies the port width of the responding memory. Together, these allow VC-2 to figure out which of the data bytes it just latched are valid and should be processed.

A bus monitor input cycle can transfer anywhere from one to four pixels to VC-2, depending on the size and alignment of the memory access. Typically, VC-2 driver software arranges for most bus monitor input operations to be aligned longword transfers, for maximum efficiency. The VC-2 bus monitor interface conforms to the 680×0 protocol for dealing with arbitrarily sized and aligned transfers. In particular, operation with either 32 bit or 16 bit memory is fully supported. After VC-2 captures one to four pixels from a bus monitor input cycle, it enables its Pixel Processing Path to process each pixel in sequence. Two clock ticks are required to process each pixel. While the Pixel Processing Path is busy processing pixels from a bus monitor input, VC-2 asserts the moninh output to cause a subsequent bus monitor input to be held off until the data capture latch is emptied of the previous pixels.

Figure 10:
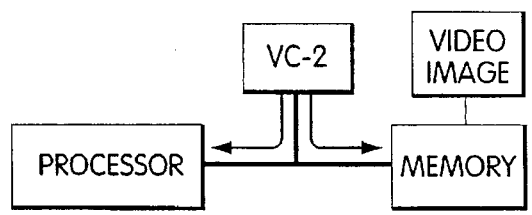
FIG. 10 is a diagram like that of FIG. 7 illustrating bus monitor output.

As shown in FIG. 10, the processor causes pixels to be output from VC-2 and written into memory by reading from memory using specially tagged addresses (tagged differently than the bus monitor input addresses). There are two distinct address tags for bus monitor outputs, corresponding to the two output images, A and B.

VC-2 recognizes the address tagging and drives pixel values onto the bus; the image processor memory control circuitry (not illustrated) also recognizes the address tagging and causes the addressed memory to be written with the data supplied by VC-2. From the processor's perspective, the read operation returns the data supplied by VC-2.

A bus monitor output cycle is signalled by assertion of mon while cmd[1:0]=2 or 3 (for output A and B, respectively). In a bus monitor output cycle, VC-2 drives the data bus with processed pixel data from its output rings.

Each output ring (A and B) contains 12 bytes, organized as three longwords. In a bus monitor output, the cmd[0] line selects the A ring (low) or the B ring (high) for output. A ring read pointer selects which longword of the selected ring is output. The a[1:0] lines control how the bytes of the selected ring longword are driven onto the bus, according to the 680×0 bus protocol.

During a bus monitor output, VC-2 captures a[1:0], siz[1:0], and dsack[1:0] and decodes them to determine which bytes were actually stored in the memory. When VC-2 sees that the final byte of a ring A longword is stored in a bus monitor output cycle, VC-2 advances the ring read pointer.

VC-2 responds to bus monitor output cycles without regard for the state of moninh. This allows a sequence of longword monitor input/monitor output operations to be performed at a rate of eight clocks per longword input/output pair. However, care must be taken to avoid outputting a ring longword while it is being updated by an enabled Pixel Processing Path.

Pixel Processing Path

This section provides an overview of the processing portion of VC-2.

The Pixel Processing Path uses a pipelined architecture, requiring two clocks to accept each input pixel. The Control & Timing section of VC-2 enables advance of the pixel processing pipeline whenever a bus monitor input captures up to 4 bytes of pixel data. Note that the pipeline does not automatically propagate a pixel all the way to the output; the pipeline is advanced only when new pixels are fed in. Thus, to obtain the final output pixels in a processing sequence, VC-2 driver software needs to feed in dummy pixels after the final input pixel.

Figure 11:
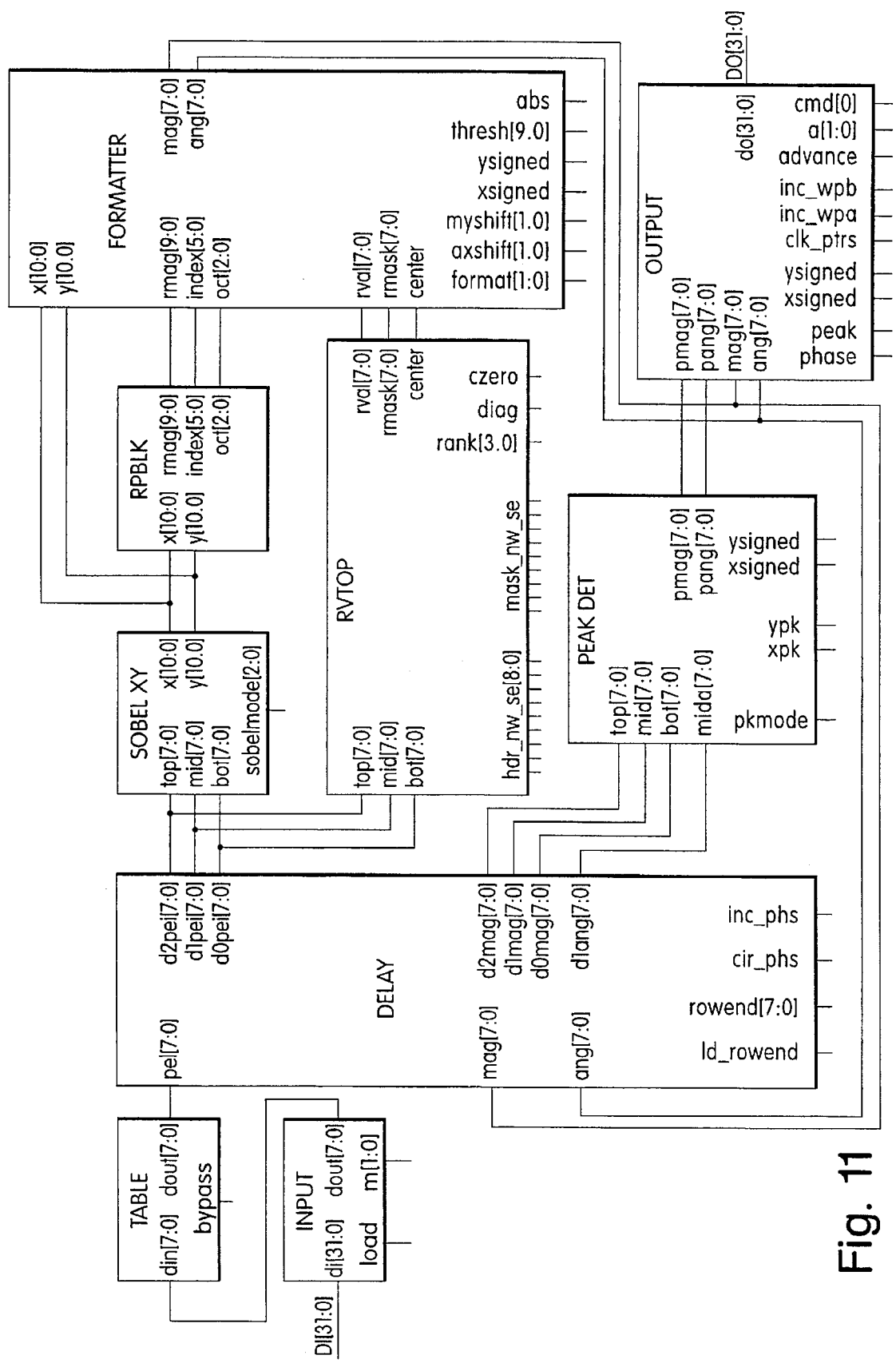
FIG. 11 is a schematic of the pixel processing path in the coprocessor.

FIG. 11 shows the internal structure of the Pixel Processing Path. In FIG. 11, data flows from left to right in each block. Most of the blocks have one or more signals at their bottom, representing the "various mode bits and control signals" of FIG. 6. The xsigned control inputs of the Formatter, Peak Det, and Output blocks are driven by a common signal, as are the ysigned control inputs.

As can be seen in FIG. 11, there is more than one path for pixel data to take between the DI input and the DO output of the processing pipeline. In particular, the Formatter block can take its input from the Sobel XY, Rpblk, or Rvtop block. Similarly, the Output block can take its input from the Formatter or the Peak Det block. The choices of input at the Formatter and Output blocks are independent, so there are six possible data paths.

These six data paths can be thought of as defining the fundamental processing topologies available in VC-2. Within each topology, there is a wide variety of processing options available, stemming from the mode/control bits on the individual processing blocks, and the manner in which data are fed into and output from VC-2.

The remainder of this section illustrates the various topologies.

In each of the topologies, pixel data flow through the Input block, the Table block, and the top section of the Delay block; these are omitted from the next Figures discussed for clarity.

Figure 12:
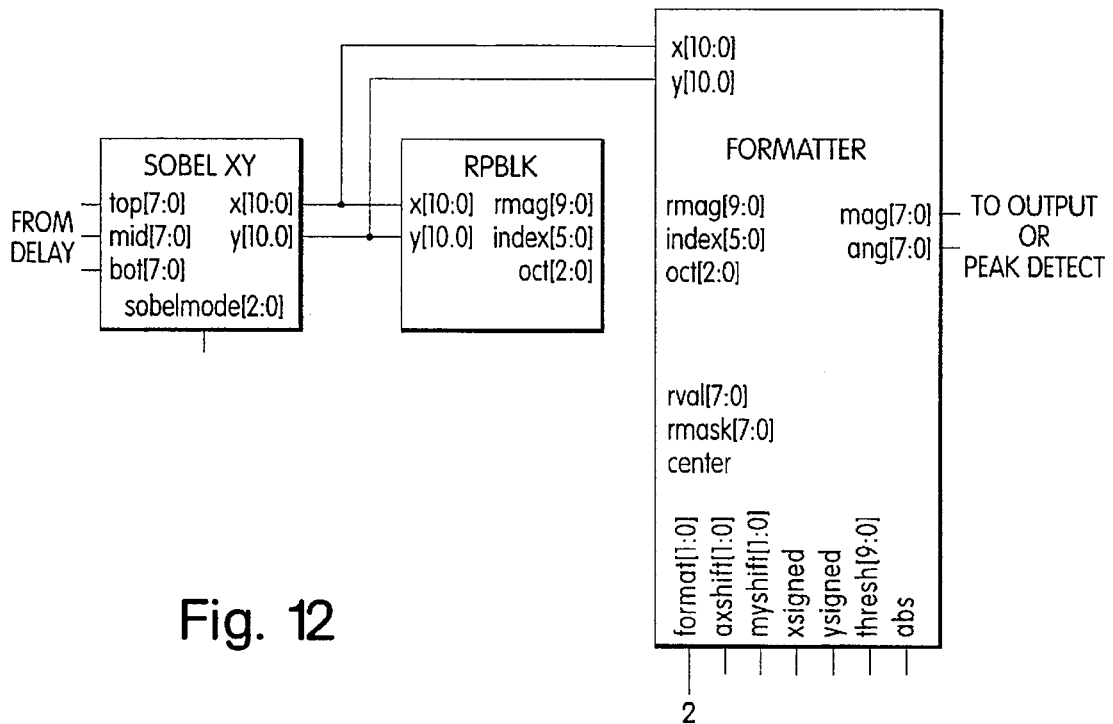
FIG. 12 is a schematic of the rectangular processing topology in the coprocessor.

In the Rectangular processing topology illustrated in FIG. 12, the Formatter block obtains its input from the Sobel XY block.

Figure 13:
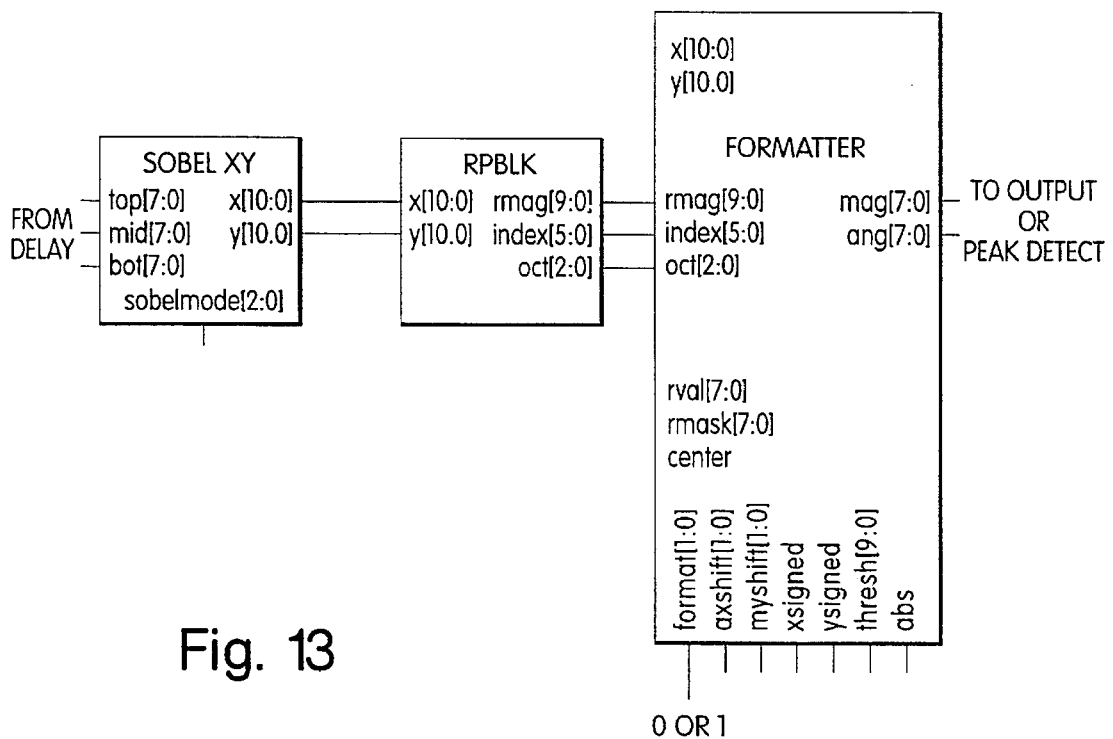
FIG. 13 is a schematic of the polar processing topology in the coprocessor.

In the Polar processing topology illustrated in FIG. 13, the Formatter block obtains its input from the Rpblk block.

Figure 14:
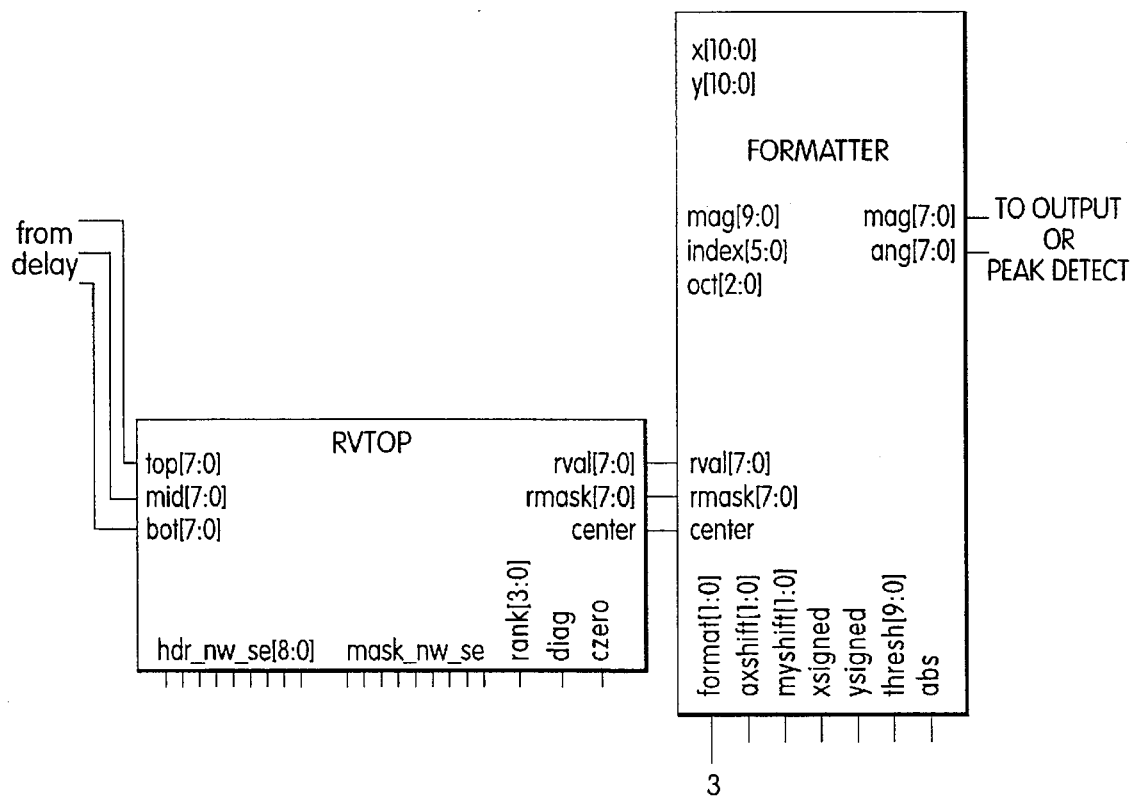
FIG. 14 is a schematic of the rank processing topology in the coprocessor.

In the Rank processing topology illustrated in FIG. 14, the Formatter block obtains its input from the Rvtop block.

Figure 15:
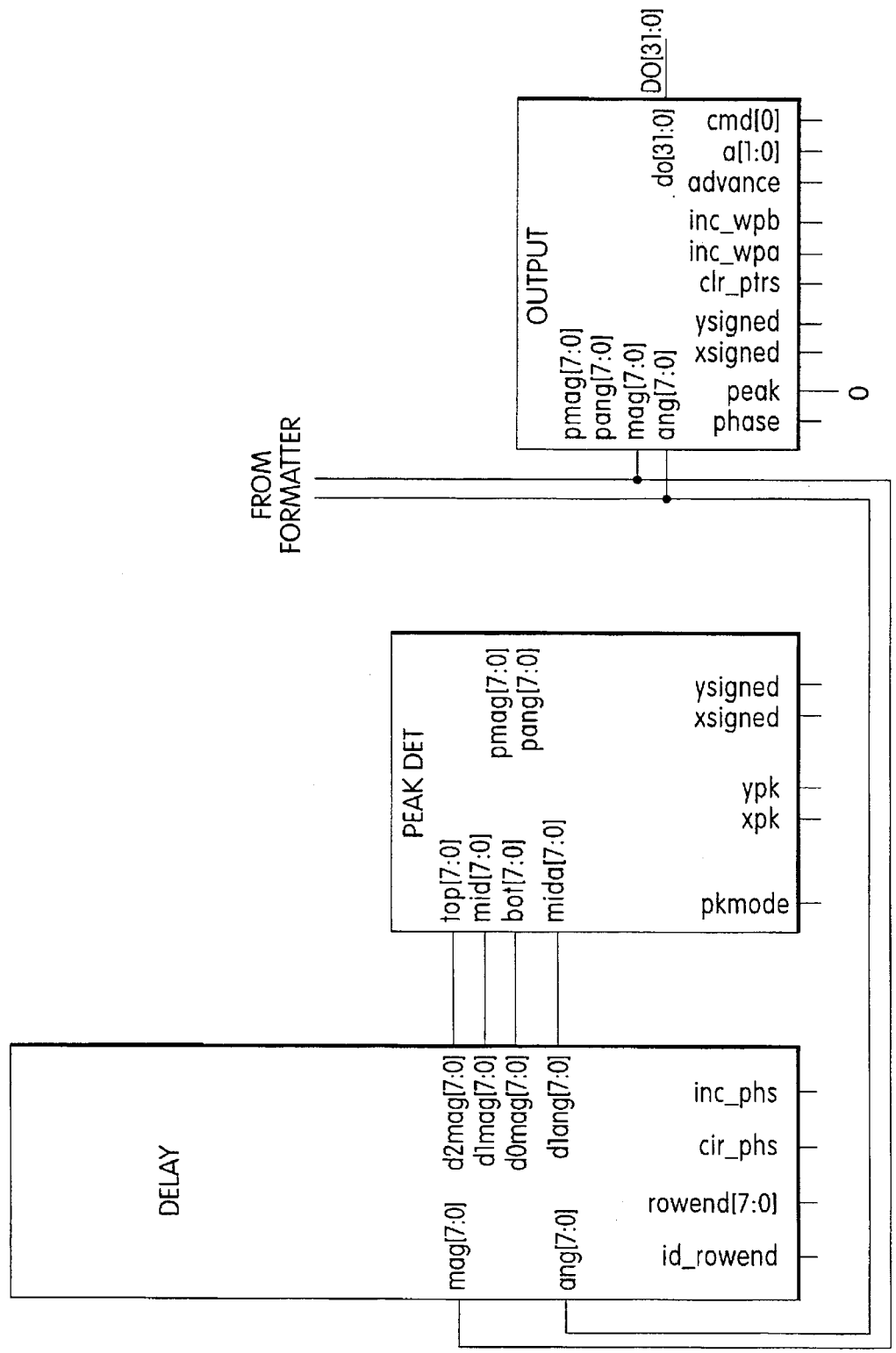
FIG. 15 is a schematic of the non-peak processing topology in the coprocessor.

Whether or not peak detection is enabled is independent of whether the processing topology is Rectangular, Polar, or Rank. FIG. 15 illustrated the non-peak detected case in which the Output block obtains its input directly from the Formatter block.

Figure 16:
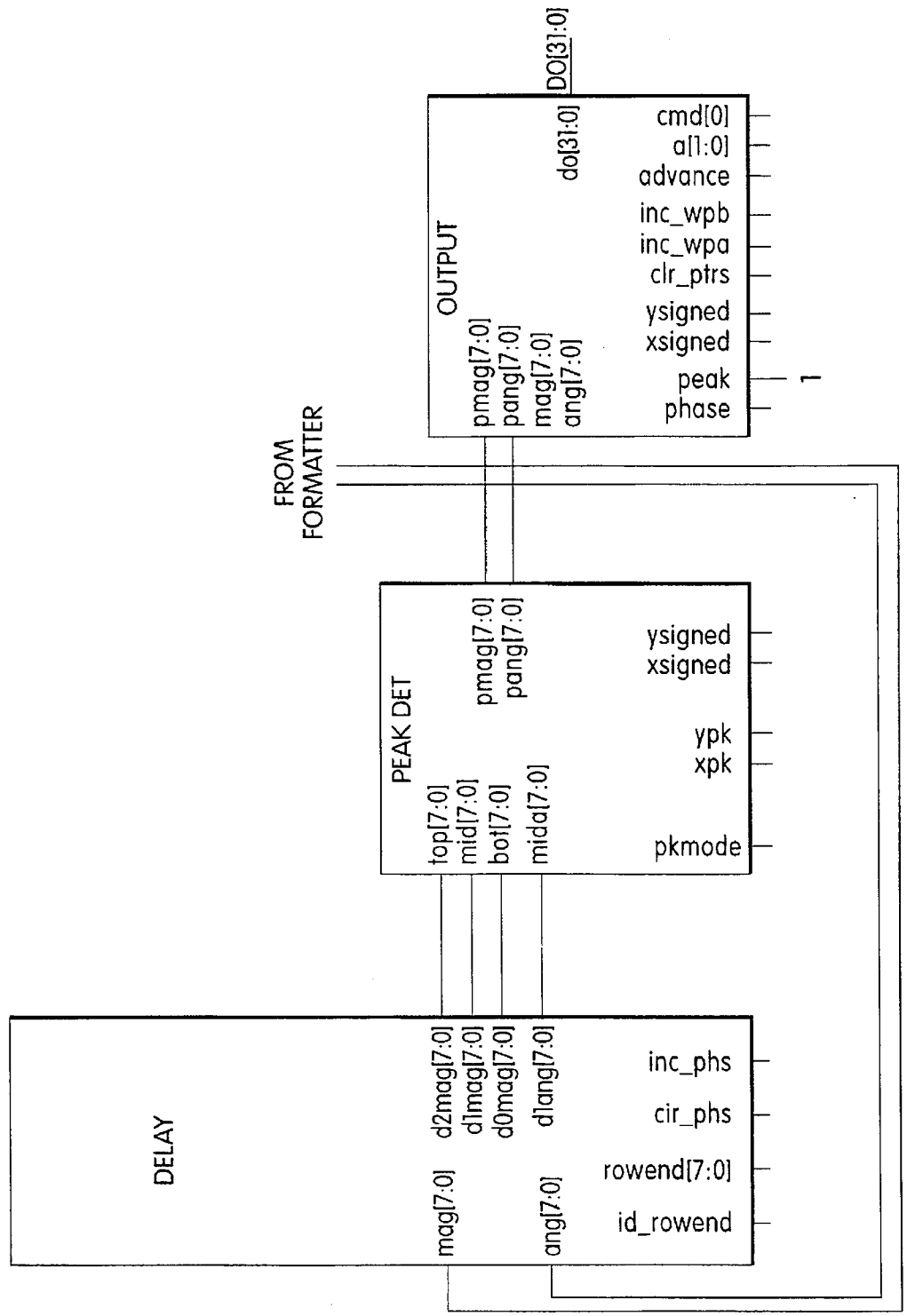
FIG. 16 is a schematic of the peak processing topology in the coprocessor.

When peak detection is enabled the Output block obtains its input from the Peak Det block, as illustrated in FIG. 16.

Software Interface

Because of VC-2's pipelined architecture, each input pixel fed via a bus monitor input operation results in a pixel being deposited into the Output block's rings. In practice, input pixels are fed to VC-2 four at a time, so results are written into each ring four at a time. Since each output ring holds only 12 pixels, output operations must therefore be interleaved with input operations.

When a single image is being output, the A ring must be used; the Output block's phase control input can be used to select which output pixel stream is to be written to ring A.

A sequence of 68000 cmpm.1 instructions can be used to efficiently interleave monitor inputs and monitor outputs:

```
; a0 points to input storage, with monitor
  input tag bits
; a1 points to output storage, with monitor
  output A
; tag bits
  cmpm.1    (a0)+,(a1)+    ; 1
  cmpm.1    (a0)+,(a1)+    ; 2
  ...
```

For efficiency, the longword transfers are longword aligned. The VC-2 driver software accomplishes this, taking into account boundary conditions due to alignment of the images and the overall pipeline depth.

Each cmpm.1 instruction performs a longword monitor input followed by a longword monitor output from ring A. Each monitor input feeds four pixels into VC-2, causing four processed pixels to be deposited into successive locations in each output ring. Each monitor output obtains four pixels from ring A; because the final byte of the A ring is transferred, the ring read pointer is incremented by each monitor output operation. Thus, the relative ring phase between the ring A write pointer and the ring read pointer does not change.

An important aspect of VC-2's design is that the pipeline is not synchronized for bus monitor output operations. That is, a monitor output operation proceeds regardless of moninh, even if the pipeline is still processing pixels from a previous monitor input. This allows interleaved input and output operations to run efficiently. The drawback is that the VC-2 driver software must take details of the pipeline behavior into account.

Specifically, the VC-2 driver software must establish the correct initial phase of the ring A write pointer relative to the ring read pointer, to guarantee that the bytes being output in a monitor output are not changing because of ongoing pipeline activity (from a just-completed monitor input).

The key is to realize that after a monitor input has been performed, the previous monitor input is guaranteed to have been completed (because the second monitor input is held off by moninh until the pipeline is idle). For example, in the code fragment above, after the monitor input portion of statement 2 has completed, all four pixels propagated by the monitor input portion of statement 1 are guaranteed to have been deposited into each ring. Thus, the ring pointers should be arranged so that the monitor output portion of statement 2 is outputting the pixels deposited in the rings as a result of statement 1.

If the alignment of the output image were always 0, then an 8 byte ring would suffice to implement the desired ring pointer relationship. The VC-2 output rings are 12 bytes in order to accommodate arbitrary output image alignment.

When two images are being output, the Output block's phase control input controls which output image is processed through ring A and which through ring B. It is sometimes convenient to swap the two output images, depending on the relative alignment of the output images.

A sequence of 68000 cmpm.1 instructions can be used to efficiently interleave monitor inputs and monitor outputs for two output images:

```
; a0 points to input storage, with monitor
input tag bits
; a1 points to output B storage, with
monitor output B
; tag bits
; a2 points to output A storage, with
monitor output A
; tag bits
cmpm.1    (a0)+,(a1)+    ; IB
cmpm.1    (a2)+,(a0)+    ; AI
cmpm.1    (a1)+,(a2)+    ; BA
...
```

Each triplet of cmpm.1 instructions processes two longwords of pixels. The sequence of bus monitor operations is: input, output B, output A, input, output B, output A, etc. The ring read pointer is incremented after each output A, so the relative ring phase between the write pointers and the read pointer does not change.

Just as in the case of a single output image, the VC-2 driver software must arrange the ring pointers to guarantee that the monitor output cycles access stable ring data. The approach taken is basically the same, except the two output image case is complicated somewhat by the possibility of differing alignments of the output images.

The Delay block has a maximum row delay of 256 pixels, limiting the width of images that VC-2 can directly process. The VC-2 driver software can overcome this limitation by processing wider images in successive vertical strips, each at most 256 bytes in width.

For neighborhood processing, it is necessary to overlap successive strips, because the border of the output image is not written. For non-peak-detected cases, the strips must overlap by 2 pixels; for peak-detected cases, the strips must overlap by 4 pixels.

Description of Schematics

The following description of a set of VC-2 simplified schematics to further describe the invention employs certain notational conventions that may not be in universal usage. This section identifies such notations and explains their meanings.

By default, all signals in the VC-2 simplified schematics are active-high. If a Signal is active-low, its signal name will contain a trailing slash. The term "asserted" means high or one for an active-high signal; "de-asserted" means low or zero. For a active-low signal, "asserted" means low or zero, and "de-asserted" means high or one.

All clock inputs in the VC-2 simplified schematics are rising-edge active.

The cardinality of a signal is the number of bits that comprise the signal. The cardinality of a signal is indicated with the following notation:

a_signal[31:0]

In this example, the cardinality of a_signal is 32. If no brackets follow a signal name, the cardinality is 1. For instance, b_signal is equivalent to b_signal[0].

The cardinality of a logic element is determined by the cardinality of its data input and output signals. For instance, if the data terminals of a mux are all of cardinality 8, then there are really 8 muxes, one for each bit slice. Exceptions to this rule are noted where appropriate.

Signals of differing cardinality may not be directly connected. Instead, the bus rewiring symbol illustrated in FIG. 17 is used to connect the signals in the schematics.

The bit spec of a bus rewiring symbol tells which bits of the source bus are connected to the bits of the destination bus, and in what order. As the bit spec is traversed in left-to-right order, it specifies which source bit is to be connected to each bit of the destination bus.

In a bit spec, the special symbol L indicates that the corresponding destination bit is to be tied to zero; H indicates that the corresponding destination bit is to be tied to one; — indicates that the corresponding destination bit is not to be connected to any source bit.

A range of source bits is indicated using a notation such as 5:2 (which has the same meaning as 5 4 3 2). A source bit can be repeated using a notation such as 3*0 (which has the same meaning as 0 0 0).

Some examples should help illustrate this. Assume that the source bus is named s[15:0], and the destination bus is named d.

If the bit spec is 15:8, then s[8] is connected to d[0], s[9] is connected to d[1], and so on, with s[15] connected to d[7].

If the bit spec is H 7:0 LL, then d[0] and d[1] are tied to zero, d[2] is connected to s[0], d[3] is connected to s[1], and so on, with d[9] connected to s[7]. In addition, d[10] is tied to one.

If the bit spec is 0 9-, then d[0] through d[8] are not connected to any source bit, and bit d[9] is connected to s[0].

If the bit spec is 2*15 15:2, then d[0] is connected to s[2], d[1] is connected to s[3], and so on, with d[13] connected to s[15]. In addition, d[14] and d[15] are both connected to s[15].

The cardinality of a destination bus is determined by all of the bus rewiring symbols that contribute to it, as illustrated in FIG. 18. For instance, in FIG. 18 the cardinality of the C result is 11. Bits C[7:0] are connected to B[7:0]; bits C[10:8] are connected together to A[0].

In the VC-2 schematics, various low-level logic primitives are used. This section explains the operation of each such primitive in a manner which will enable a person skilled in the art of digital circuit design to construct and use each primitive.

In addition to the low-level logic primitives, the VC-2 schematics contain high-level functional blocks. These are identified by capitalized names in their block symbols.

A register, illustrated in FIG. 19, is a storage device that captures the value on its D input on an active clock edge, if the enable input en is asserted. If en is de-asserted, then the active clock edge is ignored.

The Q output is driven with the D value captured at the most recently enabled active clock edge.

The cardinality of a register is determined by the cardinality of D and Q (which must have the same cardinality). The en input and the clock are common to all of the slices.

A 4-input multiplexer (multiplexers are illustrated in FIGS. 20a and 20b) operates as follows:

| s[1:0] | z |
| --- | --- |
| 0 | i0 |
| 1 | i1 |
| 2 | i2 |
| 3 | i3 |

A 2-input multiplexer operates as follows:

| s | z |
| --- | --- |
| 0 | i0 |
| 1 | i1 |

The cardinality of a multiplexer is determined by the cardinality of its inputs and output (which must have the same cardinality). The s input is common to all of the slices.

The table RAM (illustrated in FIG. 21) of the Table block operates in a read-only mode while processing pixels. The a[7:0] input selects one of the 256 table locations; the content of the selected table location is output on d[7:0].

The contents of the table RAM are programmed by slave write operations when VC-2 is not being used to process pixels; the means by which this is accomplished is not illustrated for clarity.

Standard symbols are used for logic gates such as AND, OR, XOR, etc. The cardinality of a gate is determined by the cardinality of its inputs and outputs (which much be of the same cardinality).

An exception is when one of the inputs to a multi-input gate (such as AND, OR, etc.) is of cardinality 1, and all other gate inputs and outputs are of some other cardinality. The cardinality 1 input is common to all slices.

For instance, in the example illustrated in FIG. 22, the AND gate is of cardinality 8, and the b input is common to all slices.

A counter, illustrated in FIG. 23, increments its stored count value on an active clock edge, if the enable input en is asserted. If en is de-asserted, then the active clock edge is ignored and the count is not incremented. When the stored count value reaches N, the next increment causes the stored count value to be set to 0. The count value is driven with the stored count value.

If clr is asserted, then an active clock edge causes the stored count to be set to zero, regardless of the en input.

All inputs are of cardinality 1. The count output is of a number of bits sufficient to encode the maximum counter value, N. For instance, if N=10, then count is a 4 bit signal.

A down counter, illustrated in FIG. 24, decrements its stored count value on an active clock edge, if the enable input en is asserted. If en is de-asserted, then the active clock edge is ignored and the count is not decremented. If the stored count value is equal to 0, then the zero output is asserted, and the next decrement causes the stored count value to be set to $2^C-1$, where C is the cardinality of the down counter.

If load is asserted, then an active clock edge causes the stored count to be set to the value of the val input, regardless of the en input.

The cardinality of a down counter is equal to the cardinality of the val input and the count output.

The a[7:0] input selects which RAM location is to be read or written (see FIG. 25). If we is low, the do[7:0] output is driven with the current contents of the selected RAM location. If we is high, an active wclk edge stores the value at the di[7:0] input into the selected RAM location.

A decoder (see FIG. 26) operates as follows:

| S[1:0] | z0 | z1 | z2 | z3 |
| --- | --- | --- | --- | --- |
| 0 | en | 0 | 0 | 0 |
| 1 | 0 | en | 0 | 0 |
| 2 | 0 | 0 | en | 0 |
| 3 | 0 | 0 | 0 | en |

If the en input is low, then all outputs are low. If en is high, then the output selected by s[1:0] is high.

Figure 27:
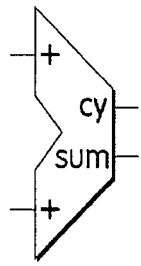
FIG. 27 is an illustration of an adder symbol used in the schematics.

The cardinality of an adder's inputs (see FIG. 27) is equal to the cardinality of the sum output. The cy output is of cardinality 1 and is the most significant bit of the result. For instance, if the cardinality of the inputs is 8, then cy and sum, taken together, form the 9 bit sum.

Figure 28:
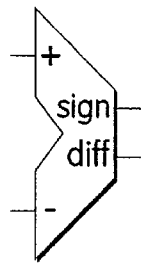
FIG. 28 is an illustration of a substracter symbol used in the schematics.

The cardinality of a subtracter's inputs (see FIG. 28) is equal to the cardinality of the diff output. The sign output is of cardinality 1 and is the most significant bit of the result. For instance, if the cardinality of the inputs is 8, then sign and diff, taken together, form the 9 bit signed difference, formatted as 2s complement.

Figure 29:
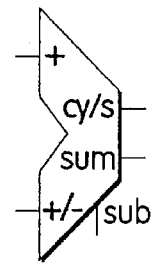
FIG. 29 is an illustration of a adder/substracter symbol used in the schematics.

An adder/subtracter (see FIG. 29) acts as an adder if its sub input is low, or a subtracter if its sub input is high.

Figure 30:
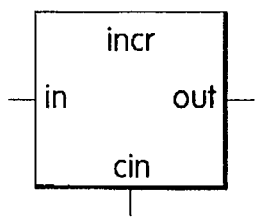
FIG. 30 is an illustration of an incrementer symbol used in the schematics.

If its cin input is high, an incrementer (see FIG. 30) adds one to the value at its in input, driving the result to its out output. If cin is low, out is the same as in.

An incrementer's input and output have the same cardinality. If the cardinality is N bits, then the increment is carried out modulo $2^N$.

Figure 31:
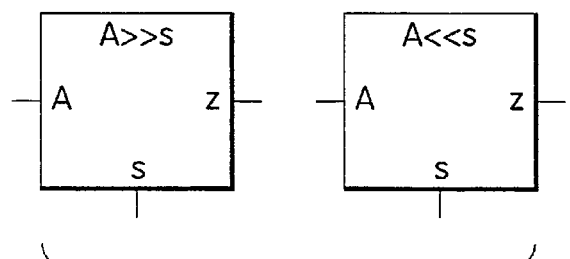
FIG. 31 is an illustration of shifter symbols used in the schematics.

A shifter (see FIG. 31) performs a logical right (or left) shift on its A input, driving the result to its z output. The s input determines the shift count. For a right (left) shift, zeros are shifted in to the most (least) significant bit positions; least (most) significant bits are discarded.

The cardinality of the A input is the same as the cardinality of the z output. The cardinality of the s input determines the maximum shift count.

Figure 32:
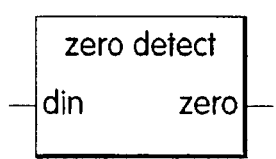
FIG. 32 is an illustration of a zero detect symbol used in the schematics.

A zero detect logic element (see FIG. 32) sets its zero output high if its din input is equal to zero; if din is non-zero, the zero output is driven low. If the din input is of cardinality greater than 1, then the zero output is set according to whether all din bits are zero.

Figure 33:
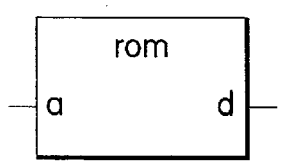
FIG. 33 is an illustration of a ROM symbol used in the schematics.

As shown in FIG. 33, a ROM's address input a selects a value stored in the ROM, which is output at d. The cardinality of the a input determines the number of entries in the ROM; the cardinality of the d output is the bit width of each entry. Thus, a ROM with 1024 eight-bit entries has a 10 bit address input and a 8 bit data output.

Figure 34:
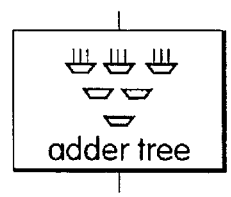
FIG. 34 is an illustration of an adder tree symbol used in the schematics.

An adder tree (see FIG. 34) takes 9 one-bit inputs, and outputs a four-bit result which encodes (in binary) the number of inputs that were set to one.

Some details have been omitted from the schematic set to be described; these are outlined below. All omitted details pertain to aspects of digital design that arise in any integrated circuit design, and whose solution/implementation are obvious to an engineer skilled in the art of digital integrated circuit design.

The details omitted for clarity include pipeline registers. The simplified schematic set explicitly shows the pipeline registers needed for pixel delays related to neighborhood formation, as these are directly relevant to the correct functional behavior. Additional pipeline registers can be used to improve the pixel-processing throughput of VC-2; to avoid obscuring the functional architecture, these are not shown in the schematic set.

Also omitted are slave access to mode bits. VC-2 contains several processor-accessible registers whose bits drive the various mode bits of VC-2 functional blocks (for example, sobelmode[2:0], xsigned, ysigned, etc.). These mode registers are not illustrated.

Slave access to control bits is also omitted. VC-2 contains several processor-activated control signals (for example, clr_phs, clr_ptrs, inc_wpa, etc.). The means by which the processor is allowed to activate these signals is not illustrated.

Also omitted is slave access to the Table block's memory. The means by which the processor loads the contents of the Table block's lookup table memory is not illustrated. Note that this is simple to implement, since the processor accesses the Table memory only when VC-2 is idle (not processing pixels).

Also omitted are diagnostics, power distribution, and clock distribution.

Figure 35:
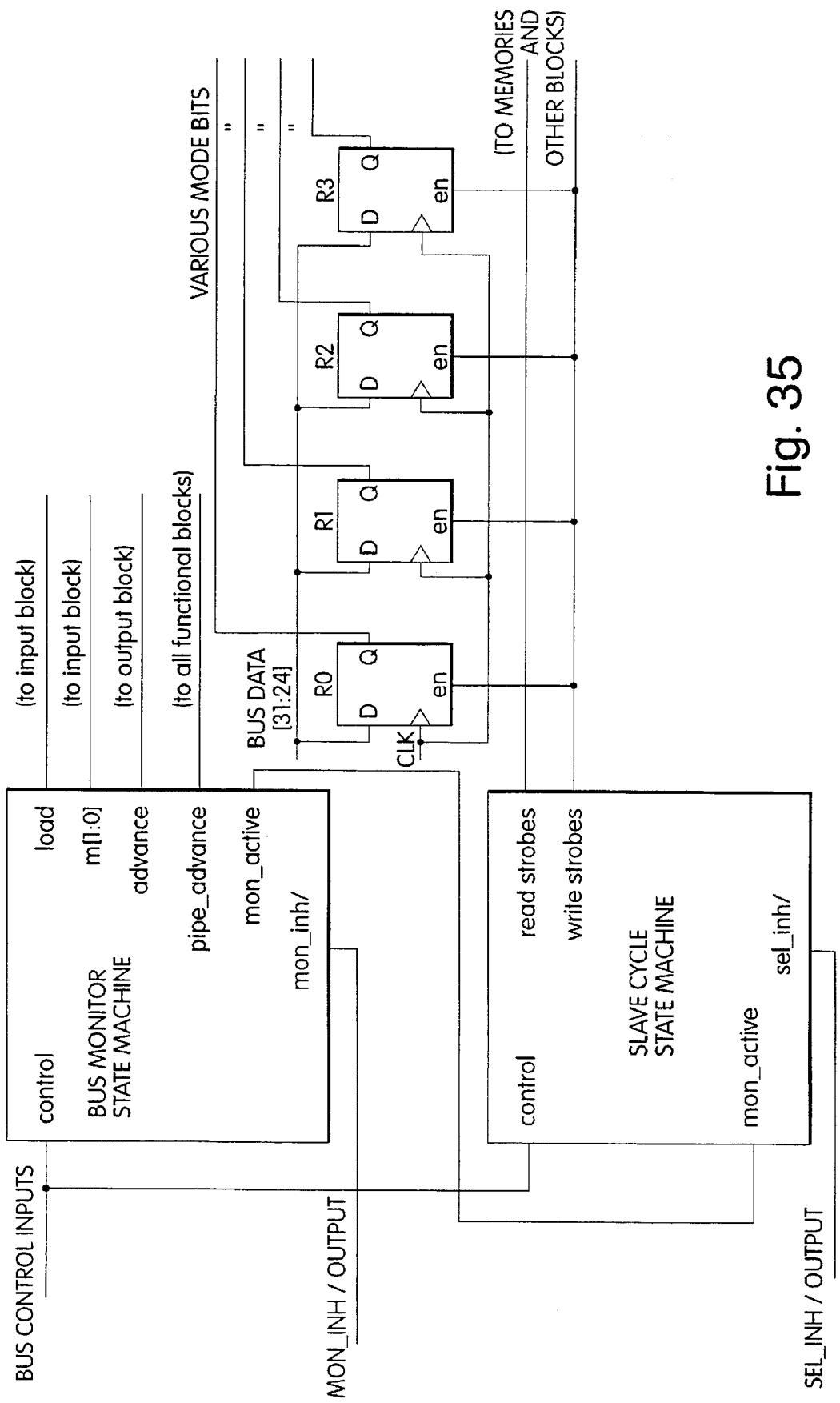
FIG. 35 is a schematic of the control logic of the coprocessor.

FIG. 35 is a schematic of the control Logic. All of the 680×0 bus control signals are inputs to the control logic.

The Bus Monitor state machine decodes all bus monitor cycles.

During bus monitor input cycles: LOAD is asserted to load the input data latch. Depending on the number of bytes transferred, PIPE_ADVANCE is asserted 1–4 times. M[1:0] is driven appropriately each time PIPE_ADVANCE is asserted. MON_ACTIVE is asserted. If the input cycle is immediately followed by a slave cycle then this will cause extra wait states to be inserted into the slave cycle to allow the pipeline processing to finish before the slave cycle starts. MON_INH/ is asserted if there were 2,3, or 4 bytes transferred in the cycle. If only 1 byte was transferred then it will be processed by the time the 680×0 can complete another input cycle even without inserting any extra wait states.

During bus monitor output cycles: ADVANCE is asserted at the end of an OUTPUTA cycle that writes the low byte of the selected A ring longword to memory. This causes the output read pointer to advance.

The Slave Cycle state machine decodes slave accesses to VC-2. It generates various read and write strobes during slave cycles. SEL_INH/ is used to insert wait states in the cycle. Normally write cycles have 1 wait state and read cycles have 3, but more may be inserted if an input cycle just completed.

There are four 8-bit control registers that drive various mode bits to various functional blocks. The control registers are read/write accessible with slave cycles.

Figure 36:
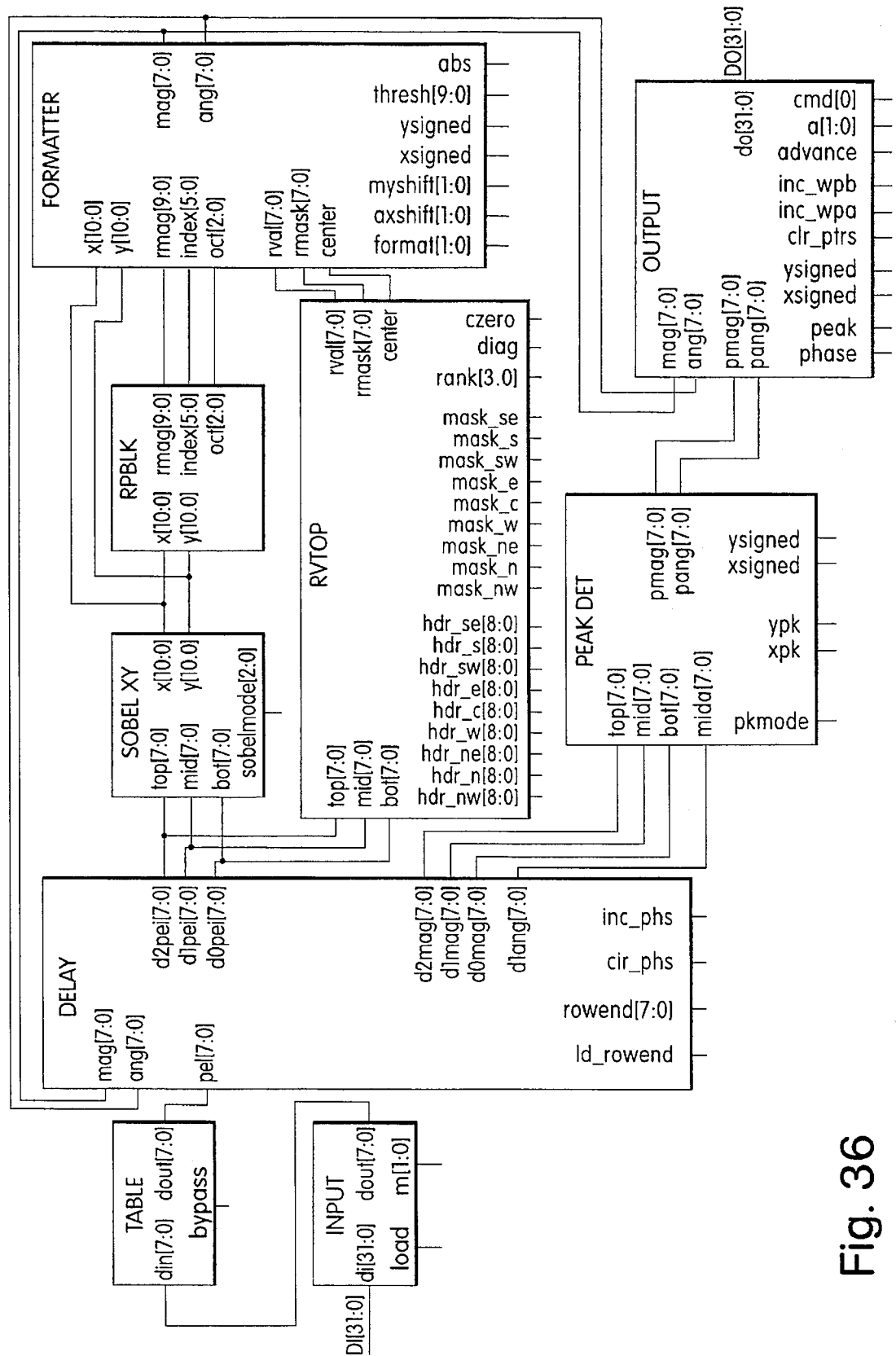
FIG. 36 is a schematic of the top level pixel processing path of the coprocessor.

FIG. 36 shows the manner in which the various pixel processing blocks are interconnected. Each of the processing blocks is discussed below.

Figure 37:
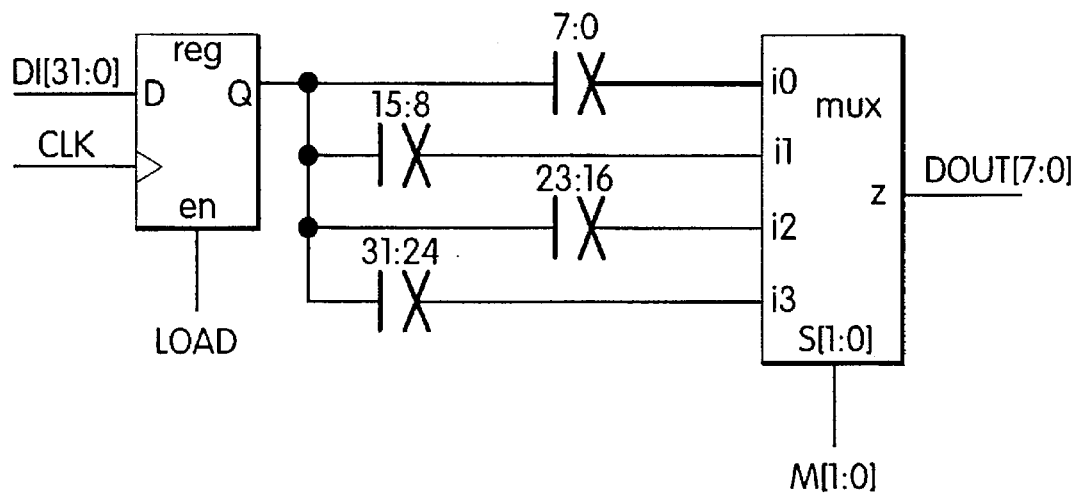
FIG. 37 is a schematic of the input block of the coprocessor.

When enabled by the load control input, the Input block (see FIG. 37) captures four pixel bytes. The m[1:0] control input selects one of the four bytes to be output on dout[7:0] to the rest of the pixel processing path. The VC-2 system control circuitry advances m[1:0] to output each stored pixel in turn until each has been output at dout[7:0], at which time another load can occur.

Figure 38:
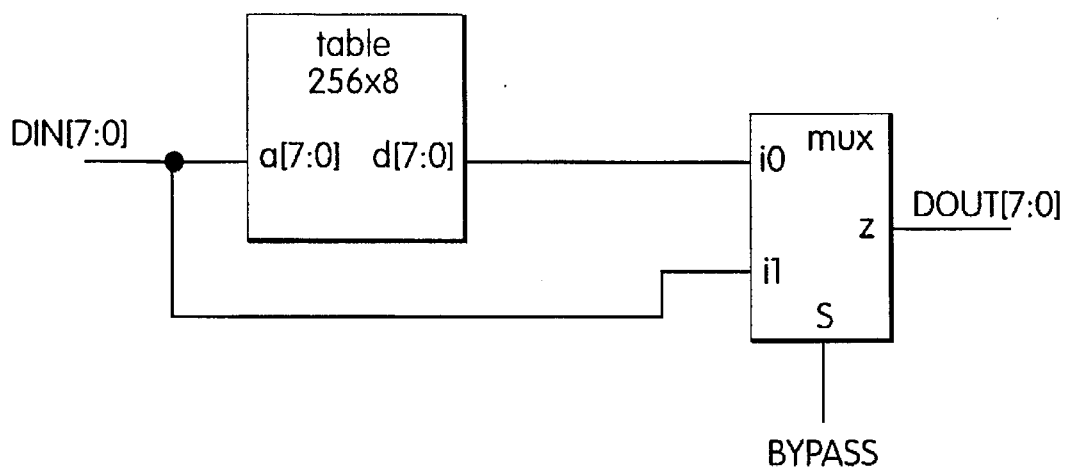
FIG. 38 is a schematic of the table block of the coprocessor.

The Table block (see FIG. 38) transforms its din[7:0] input pixel value via a 256×8 lookup table, whose contents are set (before processing pixels) by the processor. The result of the table lookup, the transformed pixel value, is output at dout[7:0].

Under control of the bypass input, the lookup table can be bypassed. In this case, the din[7:0] value is output without modification.

The Delay block (see FIG. 39) implements three row delays, for the pel[7:0] input (to feed the Sobel and Rvtop neighborhood processors) and the mag[7:0] and ang[7:0] inputs (to feed the Peak Det neighborhood processor).

Figure 39:
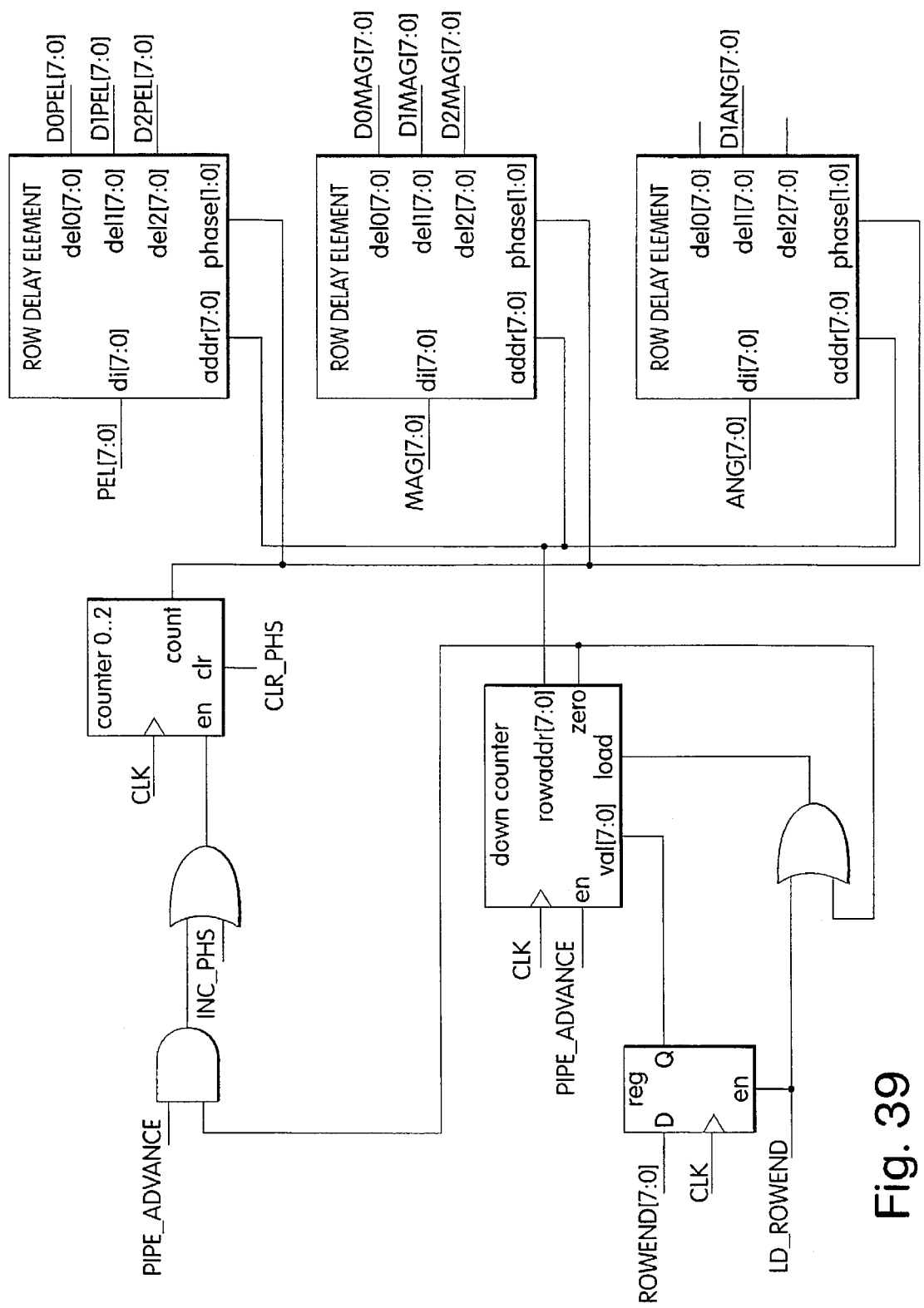
FIG. 39 is a schematic of the delay block of the coprocessor.

All three row delay elements are addressed and phased with common signals whose circuitry is illustrated in FIG. 39. The rowaddr down-counter is used to generate the memory address; the down-counter decrements for each pixel processed, and is reloaded from the rowend register whenever the down-counter reaches 0, or when the rowend register is reloaded. Thus, the row length can range from 1 to 256 pixels, depending on the rowend value (this can be set by the processor via a slave operation).

A phase counter controls the internal operation of the Row Delay Elements (see below). The phase value (0, 1, or 2) is incremented mod 3 whenever the rowaddr down-counter reaches zero. Thus, the phase value increments once per row-length pixels.

Figure 40:
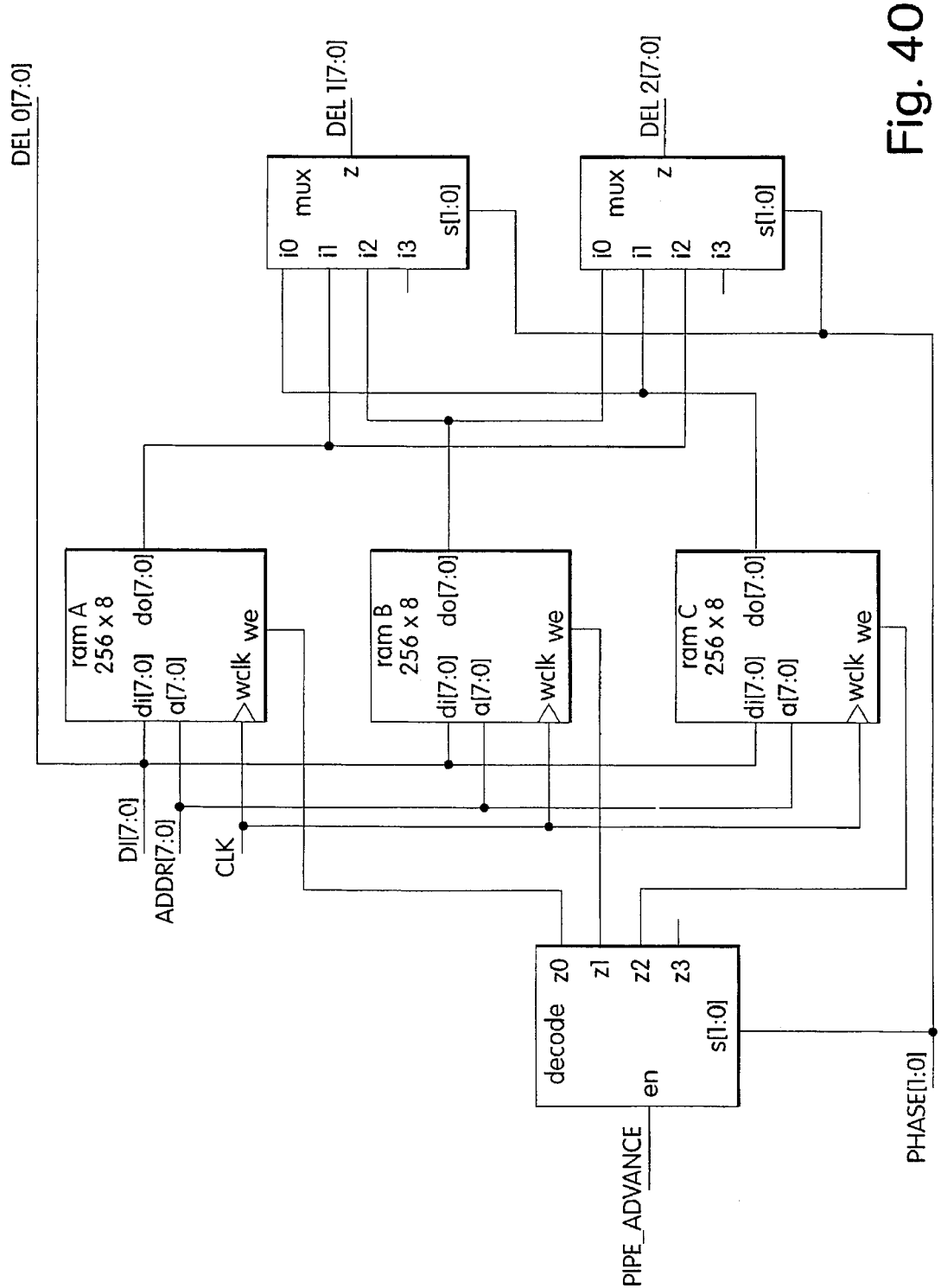
FIG. 40 is a schematic of the row delay element of the coprocessor.

The Delay block contains three Row Delay Elements (see FIG. 40), one each for the pel[7:0], mag[7:0] and ang[7:0] inputs A Row Delay Element is organized into three memories, labelled A, B, and C. During operation, new data are written to one memory, while the other two memories are read to obtain the previous two rows' data. The phase[1:0] input identifies which memories are used for what purpose.

Once per D pixels (where D is the row-length), the phase[1:0] input increments modulo 3. The following table shows how the phase[1:0] input controls the operation of the row delay element memories.

| Phase | Write Current Row | Previous Row | 2d Previous Row |
|---|---|---|---|
| 0 | A | C | B |
| 1 | B | A | C |
| 2 | C | B | A |

An efficient implementation of the three Row Delay Elements can be obtained by using instead one 24-bit Row Delay Element, slicing it into three 8-bit Row Delay Elements. This works because the addr[7:0] and phase[1:0] inputs of all Row Delay Elements are driven in common.

Figure 41:
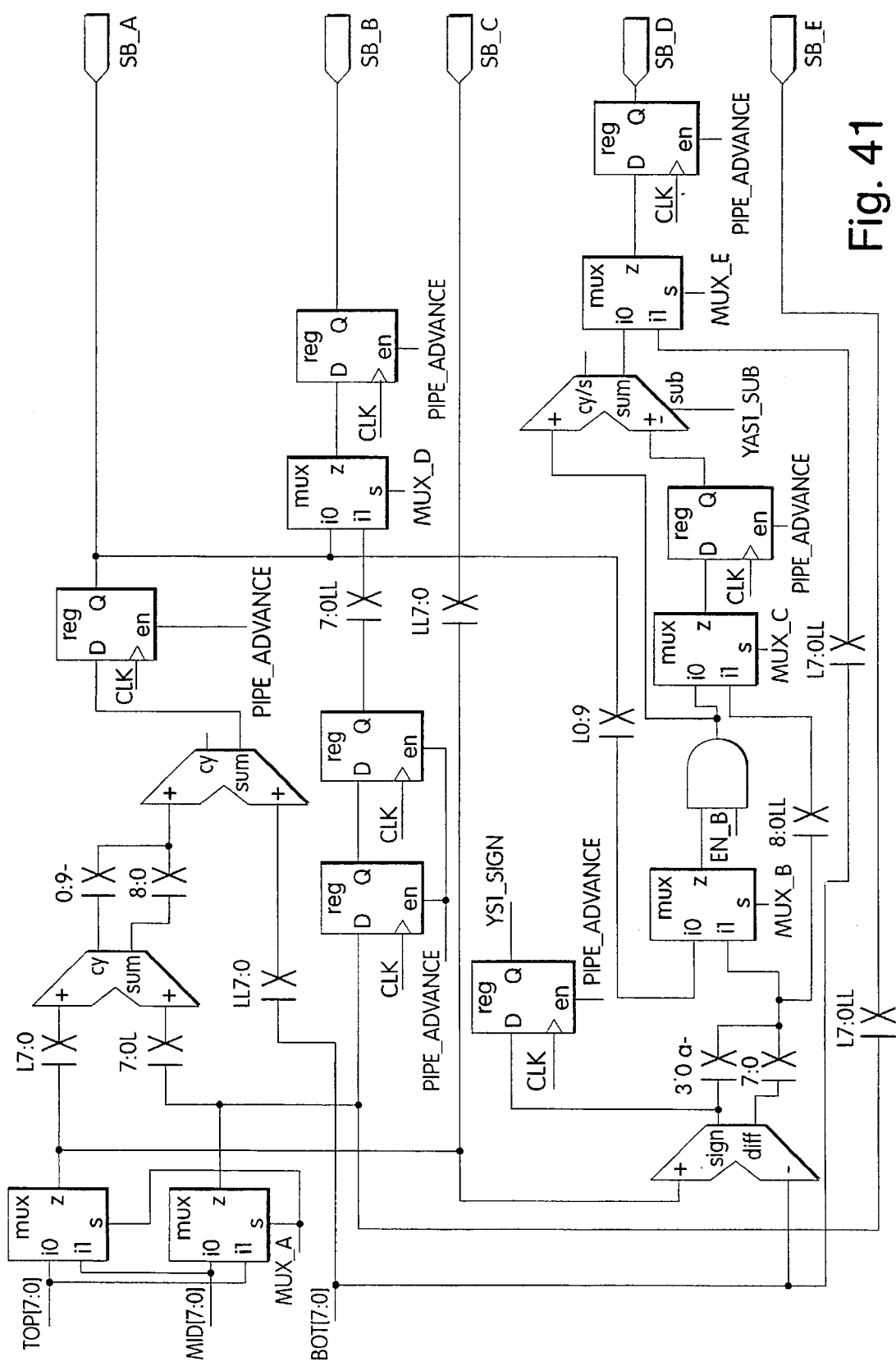
FIG. 41 is a schematic of the first part of a Sobel block of the coprocessor.
Figure 42:
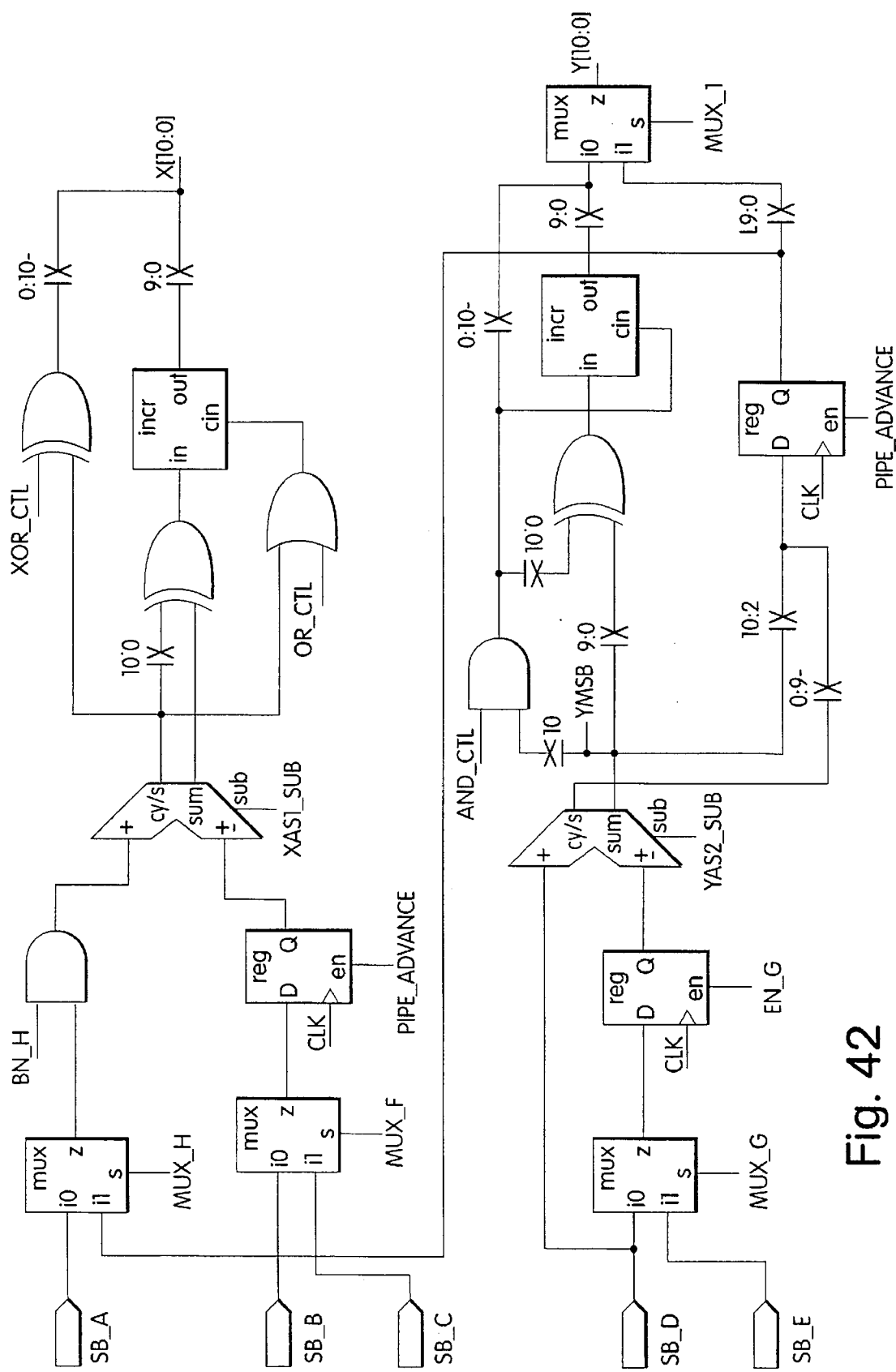
FIG. 42 is a schematic of the second part of a Sobel block of the coprocessor.

The Sobel block (see FIG. 41 and FIG. 42) has eight operating modes, selected by its sobelmode[2:0] mode control input.

The following truth table shows how the various muxes should be configured to implement each mode of the Sobel block. Entries containing '—' indicate a "don't care".

| Sobel Mode | Mode Name | mux a | mux b | mux c | mux d | mux e | mux f | mux g | mux h | mux i |
|---|---|---|---|---|---|---|---|---|---|---|
| 0 | Addition | 0 | — | — | — | 1 | — | 1 | — | 1 |
| 1 | Accumulation | 0 | — | — | — | 1 | — | 1 | — | 0 |
| 2 | Subtraction | 0 | — | — | — | 1 | — | 1 | — | 0 |
| 3 | Golden Template Comparison | 1 | — | 1 | — | 0 | — | 1 | — | 0 |
| 4 | Constant Threshold GTC | 1 | — | 1 | — | 0 | — | — | — | 0 |

-continued

| Sobel Mode | Mode Name | mux a | mux b | mux c | mux d | mux e | mux f | mux g | mux h | mux i |
|---|---|---|---|---|---|---|---|---|---|---|
| 5 | Sobel | 0 | 1 | 0 | 0 | 0 | 0 | 0 | 0 | 0 |
| 6 | Quadratic Variation | 0 | 1 | 0 | 0 | 0 | 0 | 0 | 0 | 0 |
| 7 | Gauss/Laplace | 0 | 0 | 0 | 1 | 0 | 0 | 0 | 1 | 1 |

The following truth table shows how the adder/subtracters should be controlled.

| Sobel Mode | Mode Name | yas1 sub | yas2 sub | xas1 sub |
|---|---|---|---|---|
| 0 | Addition | — | 0 | — |
| 1 | Accumulation | — | 0 | 0 |
| 2 | Subtraction | — | 1 | — |
| 3 | Golden Template Comparison | ysl_sign | 1 | — |
| 4 | Constant Threshold GTC | ysl_sign | 1 | — |
| 5 | Sobel | 0 | 0 | 1 |
| 6 | Quadratic Variation | 1 | 0 | 1 |
| 7 | Gauss/Laplace | 0 | 0 | 1 |

The following truth table shows how the various control gates should be set for each mode.

| Sobel Mode | Mode Name | en b | en h | en g | xor ctl | or ctl | and ctl |
|---|---|---|---|---|---|---|---|
| 0 | Addition | — | — | 1 | — | — | — |
| 1 | Accumulation | — | 0 | 1 | 0 | ymsb | 0 |
| 2 | Subtraction | — | — | 1 | — | — | 1 |
| 3 | Golden Template Comparison | 0 | — | 1 | — | — | 1 |
| 4 | Constant Threshold GTC | 0 | — | 0 | — | — | 1 |
| 5 | Sobel | 1 | 1 | 1 | 0 | 0 | 1 |
| 6 | Quadratic Variation | 1 | 1 | 1 | 0 | 0 | 1 |
| 7 | Gauss/Laplace | 1 | 1 | 1 | 1 | 0 | — |

Figure 43:
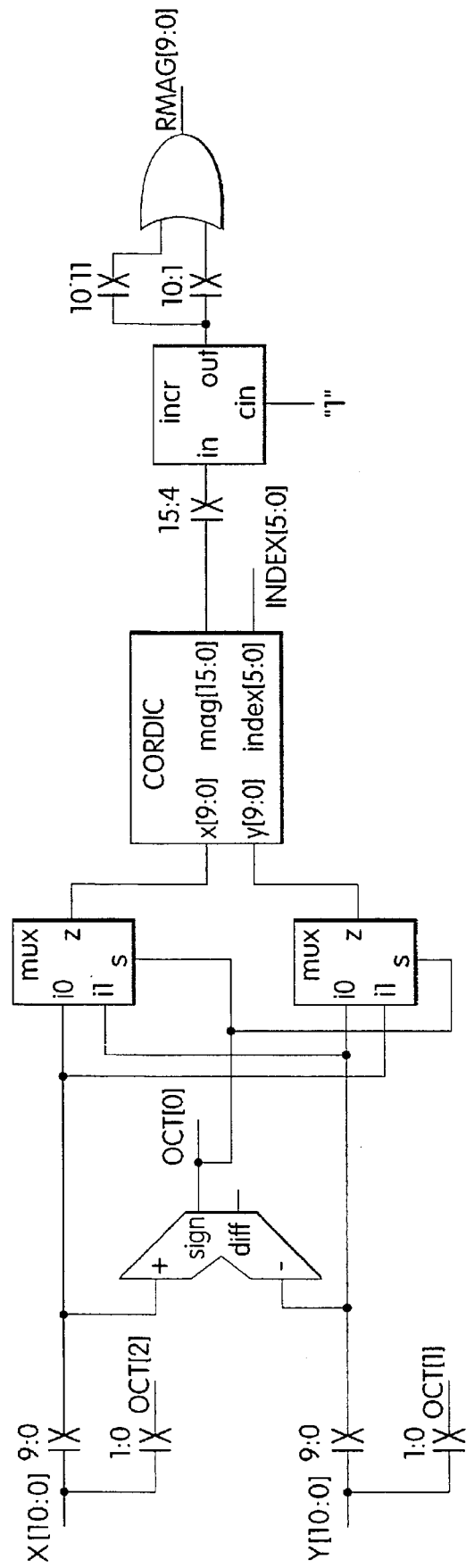
FIG. 43 is a schematic of the rectangular-to-polar processing block of the coprocessor.

The rectangular processing block (see FIG. 43) picks off the sign bits of the x[10:0] and y[10:0] inputs, outputting the x and y sign bits as oct[2] and oct[1], respectively. Because the inputs are in sign/magnitude format, x[9:0] and y[9:0] are the x and y gradient magnitudes, respectively.

The x[9:0] and y[9:0] gradient magnitudes are compared and possibly swapped so that the x[9:0] input to Cordic is greater than or equal to the y[9:0] Cordic input. The oct[0] Rpblk output is set according to whether x and y were swapped.

After Cordic processing (see below), the fractional portion of the mag[15:0] Cordic output is rounded, leaving a 11 bit magnitude, which is clamped to a 10 bit value, which is output on rmag[9:0].

Figure 44:
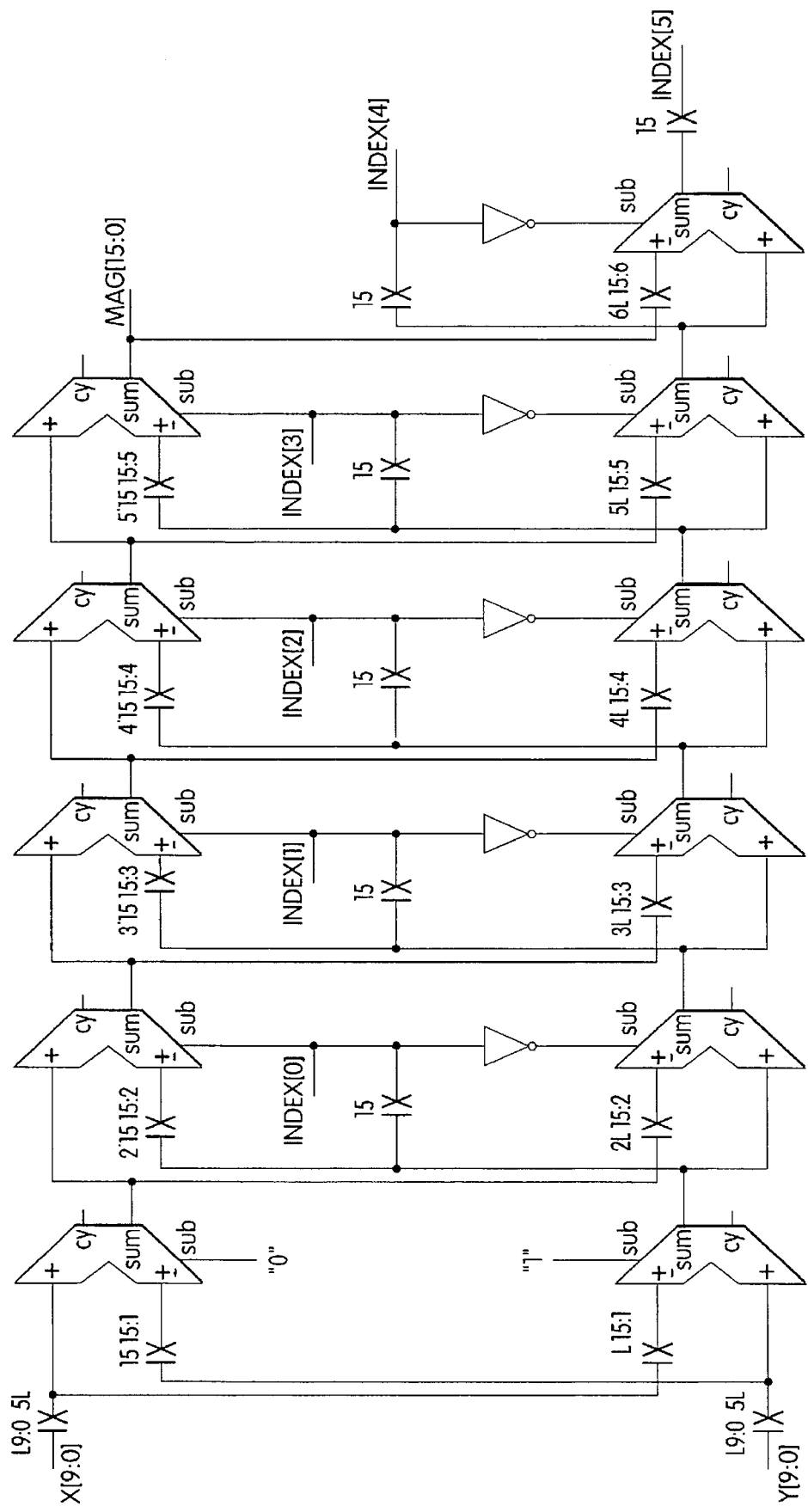
FIG. 44 is a schematic of the Cordic unit of the rectangular-to-polar processing block.

The Cordic unit (see FIG. 44) of the Rpblk block implements the Coordinate Rotational Digital Computer (CORDIC) iterative technique for rectangular to polar conversion.

CORDIC operates by rotating the original (x, y) pair through a fixed set of rotation angles such that the y value is driven to zero. At each step in the iteration, the direction of rotation is chosen according to the current y value: if y is positive, the rotation is clockwise; if y is negative, the rotation is counter-clockwise.

VC-2 uses six CORDIC steps, after which the y value will be close to zero, and the x value will be approximately proportional to the magnitude. The angle is the sum of the rotation angles used to drive y to zero (taking into account clockwise and counterclockwise rotations).

VC-2's Cordic unit assumes that its x and y inputs are positive and that x>=y (first octant). If n represents the CORDIC iteration (starting at 1), then each rotation step is given by:

$$\begin{bmatrix} X_{n+1} \\ Y_{n+1} \end{bmatrix} = \begin{bmatrix} 1 & \delta_n 2^{-n} \\ -\delta_n 2^{-n} & 1 \end{bmatrix} \begin{bmatrix} X_n \\ Y_n \end{bmatrix} \qquad \text{Equation 1}$$

In Equation 1, the value of $\delta_n$ is either +1 or −1, chosen to drive the y value towards zero. The final x value approximates the actual magnitude given by $K(x^2+y^2)0.5$, with the proportionality constant K given by:

$$K = \prod_n \sqrt{1 + 2^{-2n}} \qquad \text{Equation 2}$$

In VC-2, K is equal to about 1.1642. The final x value is output as the mag[15:0] output in fixed-point format (the lower 5 bits is the fractional part).

The angle value A is given by:

$$A = \sum_n \delta_n a\tan(2^{-n}) \qquad \text{Equation 3}$$

The $\delta_n$ values are output as index[5:0]. Specifically, index[0] is zero if $\delta_2$ is +1 (y2 positive); index[0] is one if $\delta_2$ is −1 (y2 negative). Index[1] corresponds to $\delta_3$, etc. Note that index[5:0] does not contain a bit for $\delta_1$, which is always +1 (since the input y value is never negative).

The Formatter block converts the index[5:0] output, together with Rpblk's oct[2:0] output, to an 8 bit binary angle value.

Figure 45:
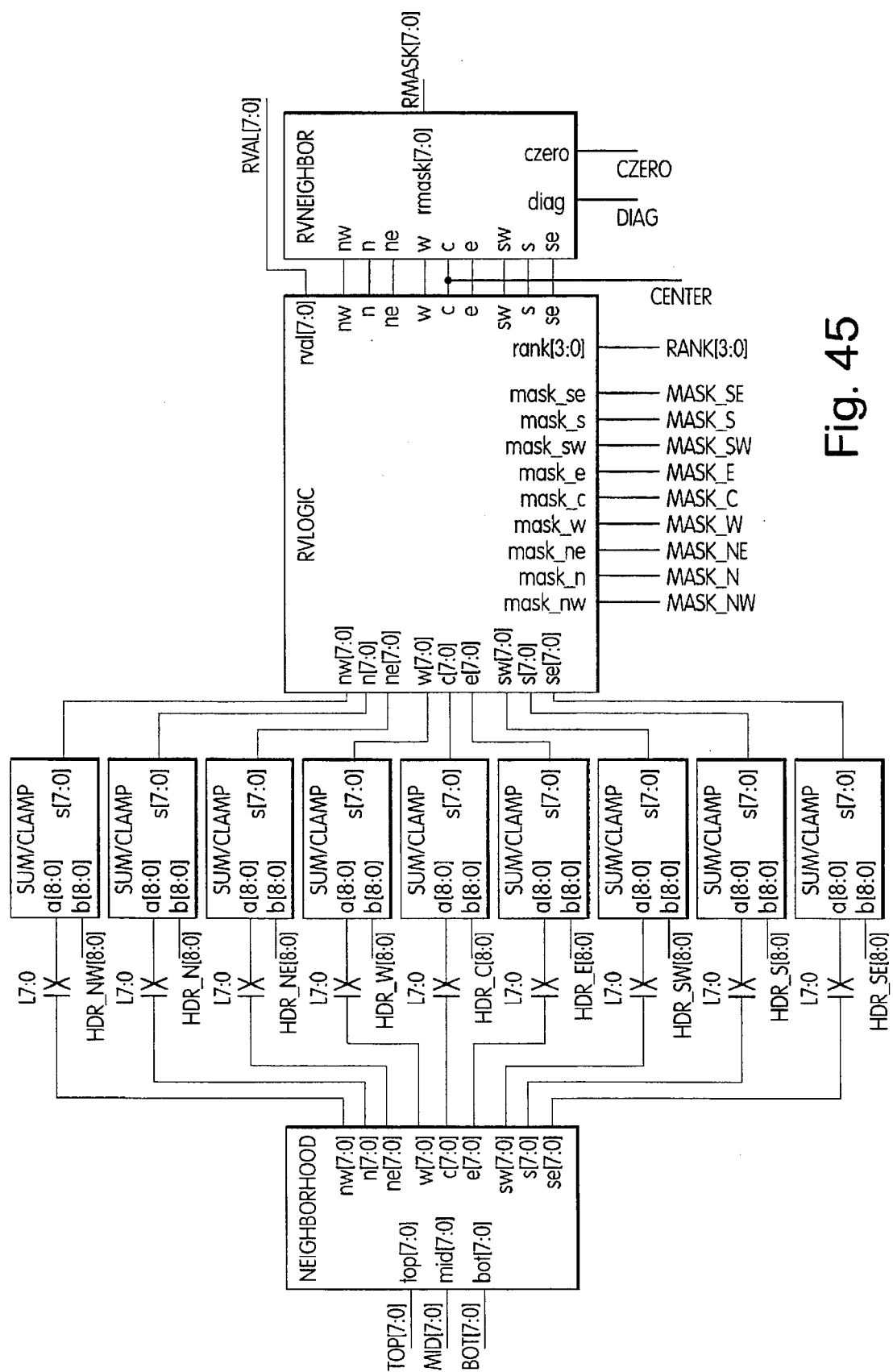
FIG. 45 is a schematic of the rank value topology block of the coprocessor.

The Rvtop block (see FIG. 45) forms a 3×3 neighborhood, adds a signed constant to each pixel value of the neighborhood, and picks the pixel value of a selected rank from the modified neighborhood.

Figure 46:
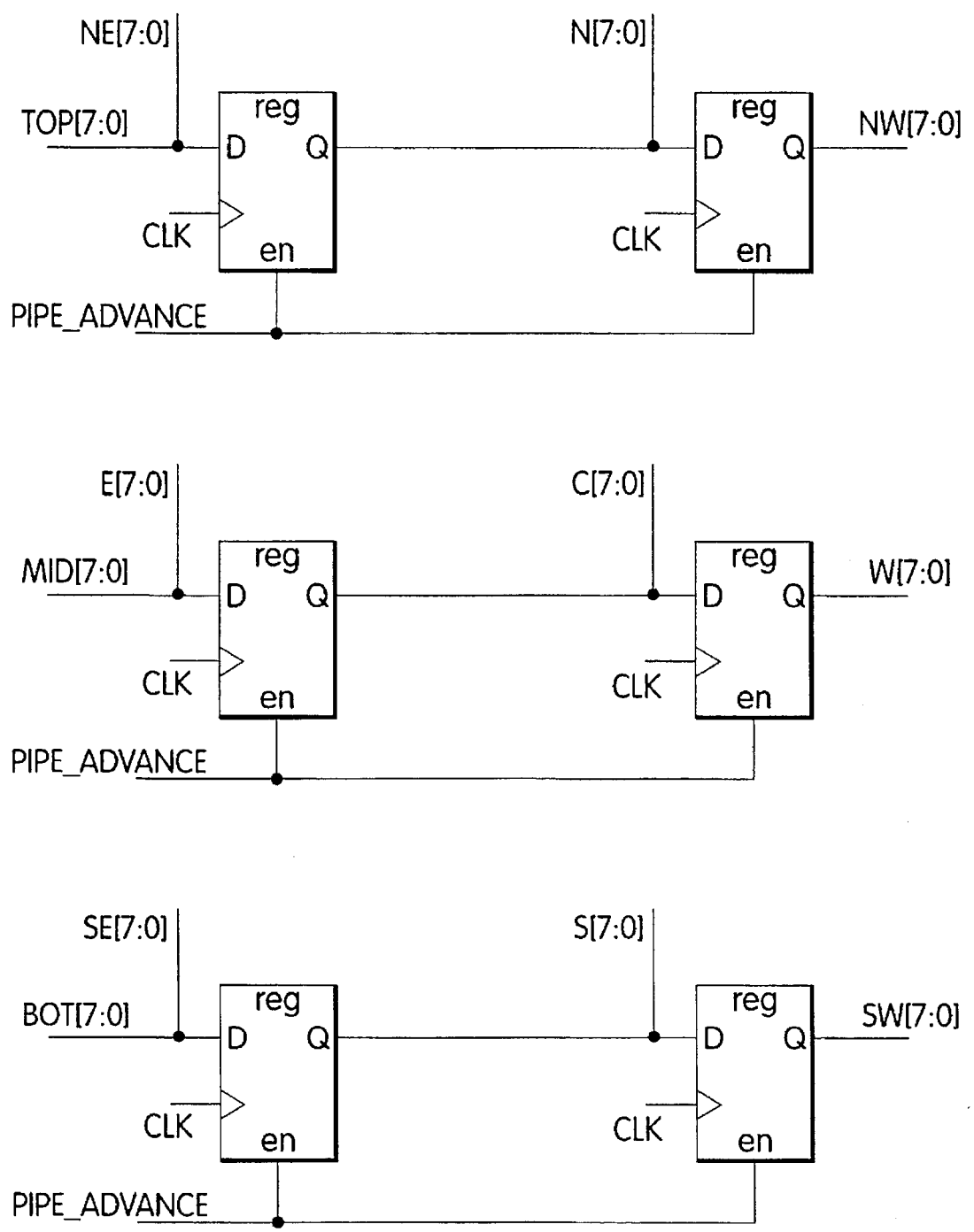
FIG. 46 is a schematic of the neighborhood block of the coprocessor.

A neighborhood (see FIG. 46) is formed from the current row, previous row, and second previous row pixel streams by introduction of 1- and 2-pixel delays.

Each pixel of the input neighborhood has a signed 9 bit 2s complement header value added to it. If the header value is negative, the result is clamped to 0 (negative result replaced with 0); if the header value is positive, the result is clamped to 255 (result greater than 255 replaced with 255).

The Sum/Clamp circuit element performs this signed addition and clamping step.

The mask input determines what neighborhood to be considered: either the entire 3×3 neighborhood or any subset. The rank input determines which rank value to select: the legal range is from 0 (for min) to # of elements in the neighborhood −1 (for max).

Figure 47:
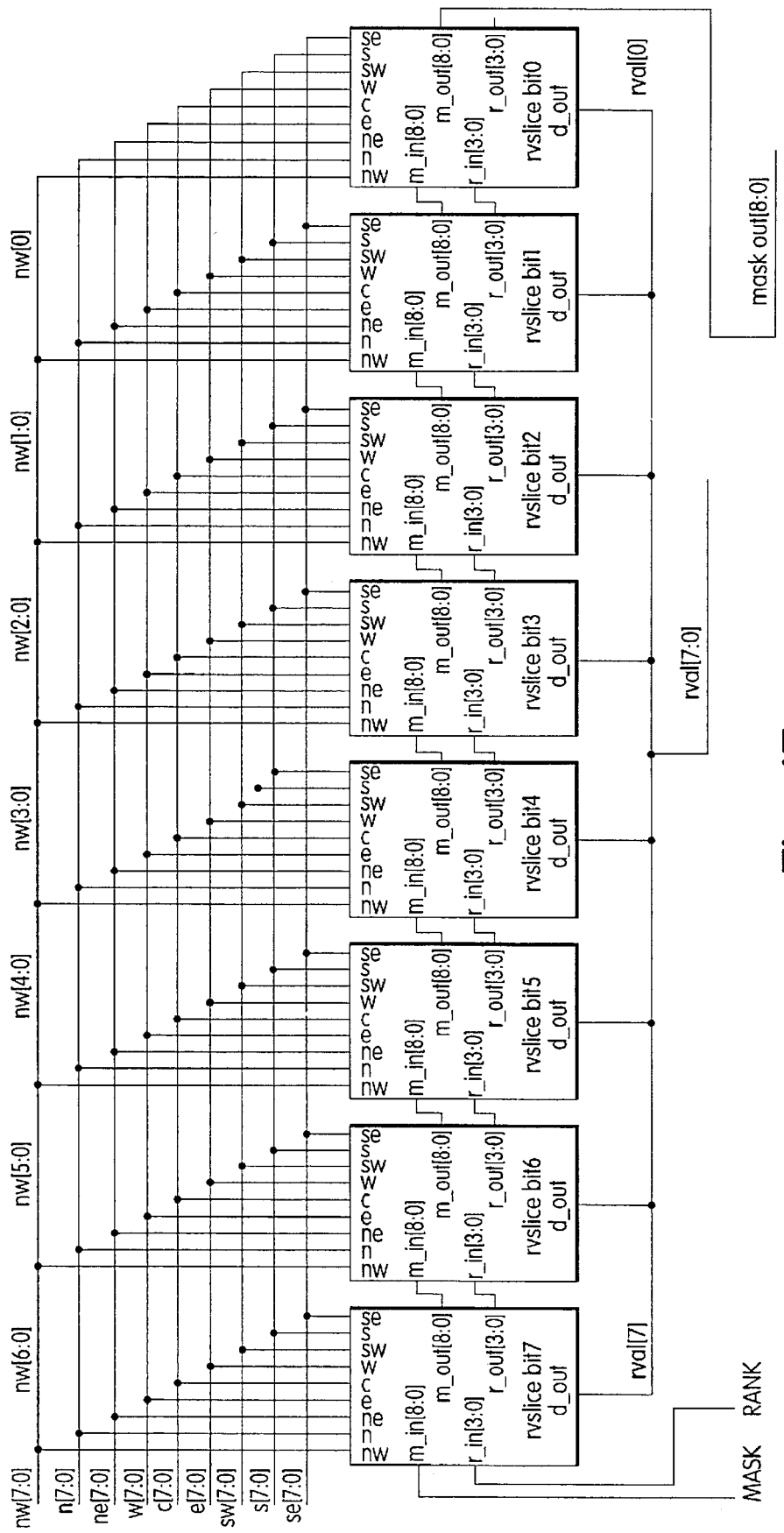
FIG. 47 is a schematic of the rank value logic block of the coprocessor.
Figure 48:
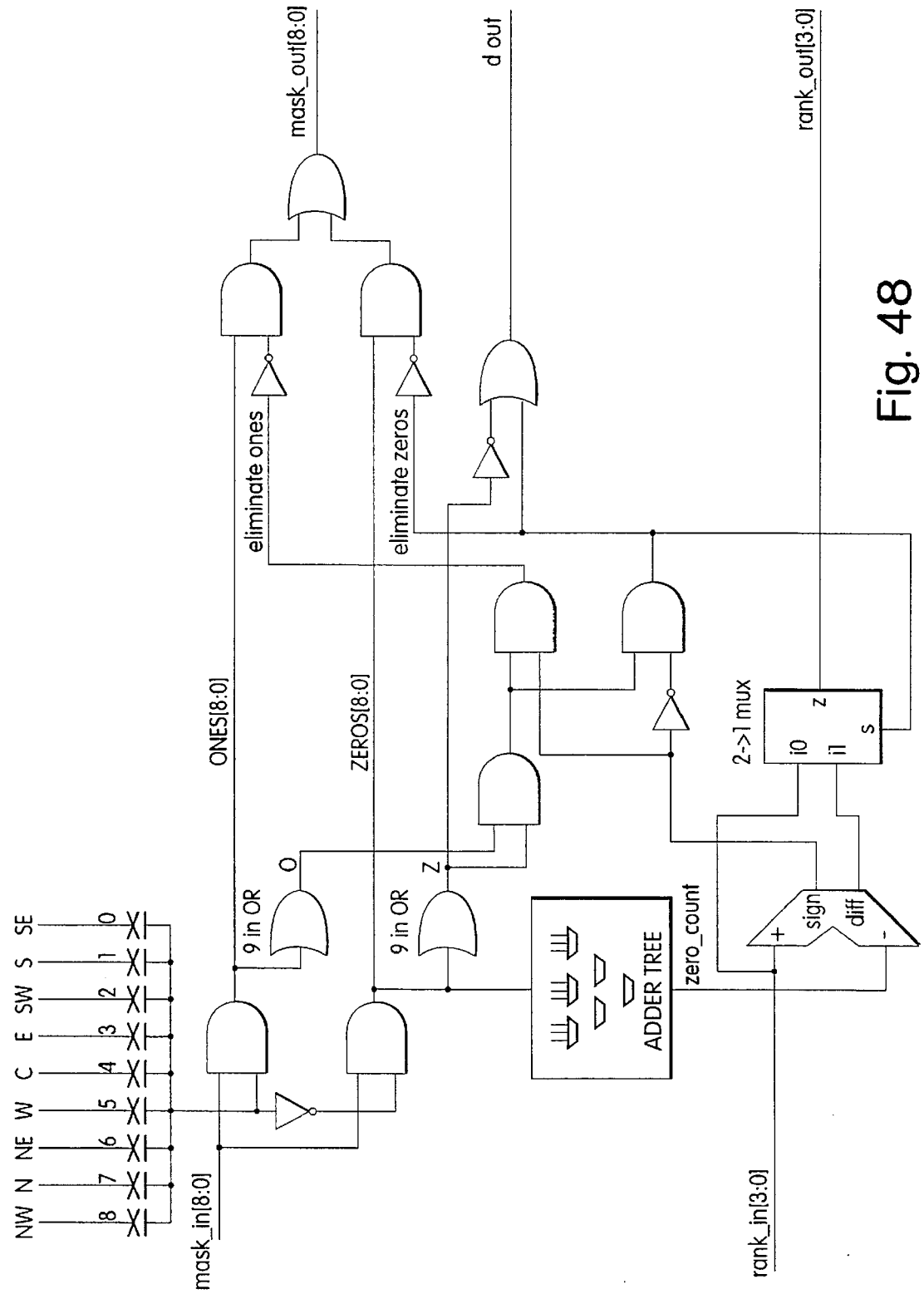
FIG. 48 is a schematic of the rank value slice implementation of the coprocessor.

The rank value logic (see FIG. 47) uses an algorithm which evaluates the neighborhood values one bit at a time, in most-significant to least-significant order, and computes the corresponding bit of the resulting data value at each stage. The RVSLICE logic block (see FIG. 48) creates a single bit of result: it is replicated 8 times. The mask and rank flow through all eight stages. Any stage that eliminates one or more elements of the neighborhood as possible values clears the associated mask bits and may change the rank_out value as well. The final mask out of the last stage corresponds to the position(s) in the neighborhood that equal the selected rank value. Note that multiple bits may be set in the final mask output: for example any rank computed on a constant neighborhood returns the constant value as the rank value and all the members of the neighborhood as equal to the selected value.

The pipelining is not explicitly shown in the diagram. The RVLOGIC block actually has a pipeline register in between each RVSLICE stage. Note that the registers get 8 bits smaller with each stage, as 9 bits of neighborhood elements are evaluated and discarded and 1 bit of result is created.

ONES[8:0] corresponds to the neighborhood elements which have a 1 in the bit position being evaluated and have not been already eliminated as a possible rank value, i.e. they correspond to a mask bit of 1. 0 is a signal which is asserted if one or more of the bits of ONES are asserted.

ZEROS[8:0] corresponds to the neighborhood elements which have a 0 in the bit position being evaluated and have not been already eliminated as a possible rank value, i.e. they correspond to a mask bit of 1. Z is a signal which is asserted if one or more of the bits of ZEROS are asserted. An adder tree sums up the number of bits that are asserted in ZEROS to create ZERO_COUNT.

If the neighborhood elements that have not been eliminated are all 0 at the bit position being evaluated then the result is 0 at that position and the mask and rank pass through unchanged. Likewise, if they are all 1 then the result is 1.

If there are some 0's and some 1's at that bit position and ZERO_COUNT is greater than the selected rank then the data output is a 0. The 1's are eliminated from consideration by having the corresponding mask bits cleared.

If there are some 0's and some 1's at that bit position and ZERO_COUNT is less than or equal to the selected rank the data output is a 1. The 0's are eliminated from consideration by having the corresponding mask bits cleared. The rank is adjusted by having the number of 0's subtracted from it.

The table below shows the actions that take place in the rv_slice block. The output section shows the actual value computed in all instances. The value computed doesn't really matter in the case of the top line of the table because it corresponds to asking for the rank value of a neighborhood with 0 elements, which is not defined.

| Inputs | | | Outputs | | |
|---|---|---|---|---|---|
| Z | O | rank_in>=zeros_count | d_out | mask_out | rank_out |
| 0 | 0 | x | 1 | mask_in | rank_in |
| 1 | 0 | x | 0 | mask_in | rank_in |
| 0 | 1 | x | 1 | mask_in | rank_in |
| 1 | 1 | 0 | 0 | ZEROS | rank_in |
| 1 | 1 | 1 | 1 | ONES | rank_in-zero_count |

The Rvlogic notes which of the enabled neighborhood elements contain the selected rank value, forming a 9 bit neighborhood code. The neighborhood code is reduced to 8 bits, and output on rmask[7:0]. The diag and czero inputs to the Rvneighbor logic block control how the 9 bit neighborhood code is reduced to 8 bits.

The table below shows how diag and czero influence generation of rmask[7:0]. In the table, the symbols NW, N, NE, W, C, E, SW, S, and SE represent the bits of the 9 bit neighborhood code that is being reduced to 8 bits.

| | | rmask[7:0] | | | | | | | |
|---|---|---|---|---|---|---|---|---|---|
| diag | czero | bit 7 | bit 6 | bit 5 | bit 4 | bit 3 | bit 2 | bit 1 | bit 0 |
| 0 | 0 | SW | NW | SE | NE | W | S | E | N |
| 0 | 1 | same as above, except all zero is C bit is set | | | | | | | |
| 1 | 0 | dd | dw | de | C | W | S | E | N |
| 1 | 1 | dd | dw | de | C | same as above, except all zero if C bit is set | | | |

The terms dd, dw, and de have the following definitions:

```
dd = (NW & SW) | (NE & SE)
dw = SW | NW
de = SE | NE
```

Figure 49:
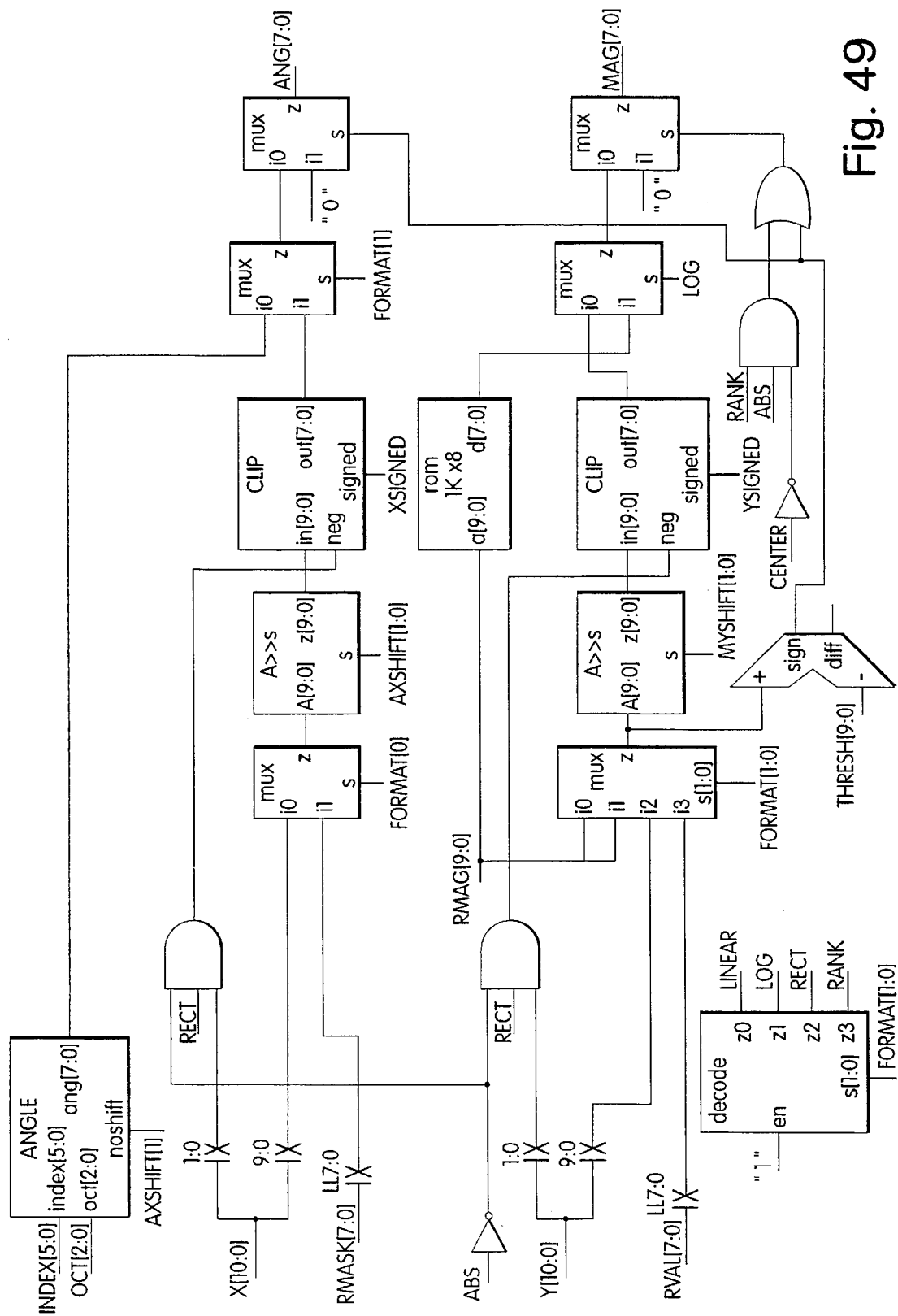
FIG. 49 is a schematic of the formatter block of the coprocessor.
Figure 50:
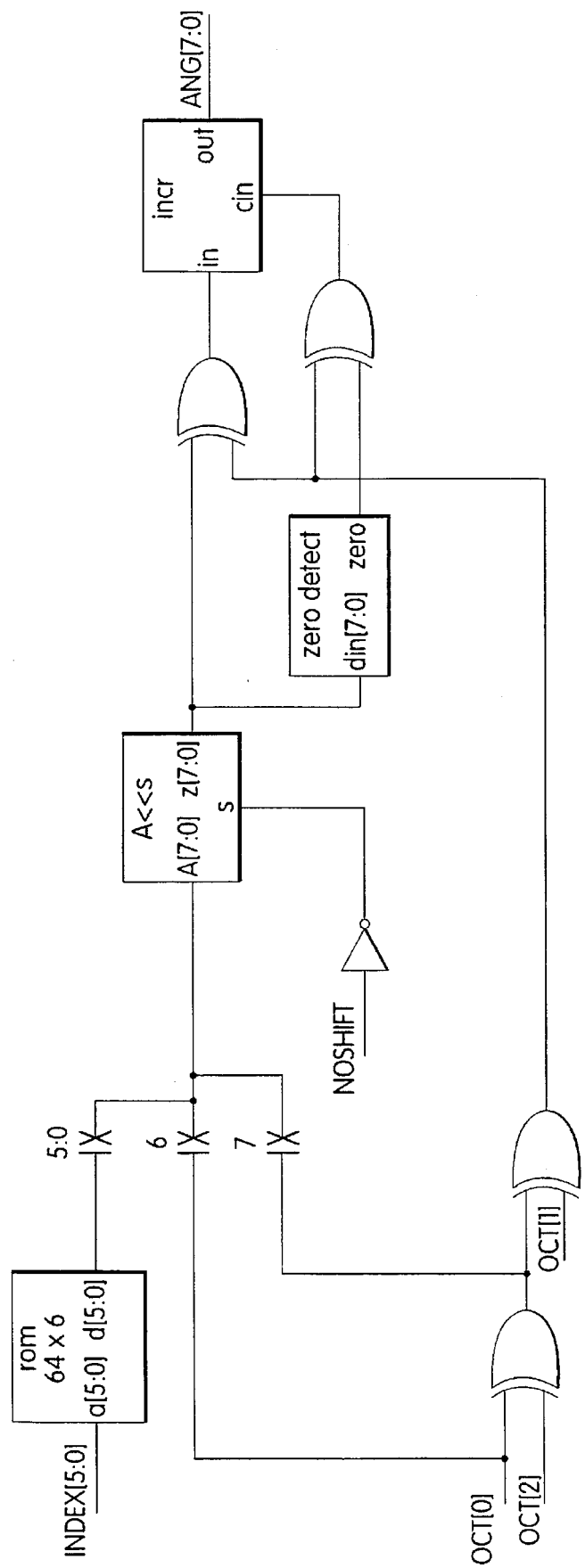
FIG. 50 is a schematic of the angle block of the coprocessor.

The Formatter block is shown in FIG. 49.

The input index[5:0] is transformed (via ROM lookup table) to a 6 bit quantity that ranges from 0 to 0x20, inclusive, representing 0 to 45 degrees (inclusive).

The transformation function is:

```
00: 00 13 1d 09 20 0e 17 04 20 10 1a 06 1f 0b 15 01
10: 20 11 1b 07 20 0c 16 02 20 0f 19 05 1e 0a 14 00
20: 20 12 1c 08 20 0d 17 03 20 10 19 05 1e 0a 14 00
30: 20 11 1b 07 20 0c 16 02 20 0e 18 04 1d 09 13 00
```

All quantities are given in hexadecimal. The index[5:0] value is used to subscript the table; the value found is the angle result corresponding to that index[5:0] input value.

The oct[2:0] input is used to derive two additional angle bits (for a total of 8 angle bits), and to determine whether the angle result is to be 2s complement negated. Before negation, however, the 8 bit angle value is optionally left-shifted (inhibited by the noshift input).

The optionally left-shifted angle value is zero-detected; a zero angle is replaced with 1 or 255 (according to oct[2:0] information).

A Clip logic element implements the following function:

```
if (signed)
{   if (in[9:7] != 0) out[7:0] = (neg << 7) | 127;
    else out[7:0] = (neg << 7) | in[6:0];
}
else /* not signed */
{   if (neg) out[7:0] = 0;
    else
    {   if (in[9:8] != 0) out[7:0] = 255;
        else out[7:0] = in[7:0];
    }
}
```

Figure 51:
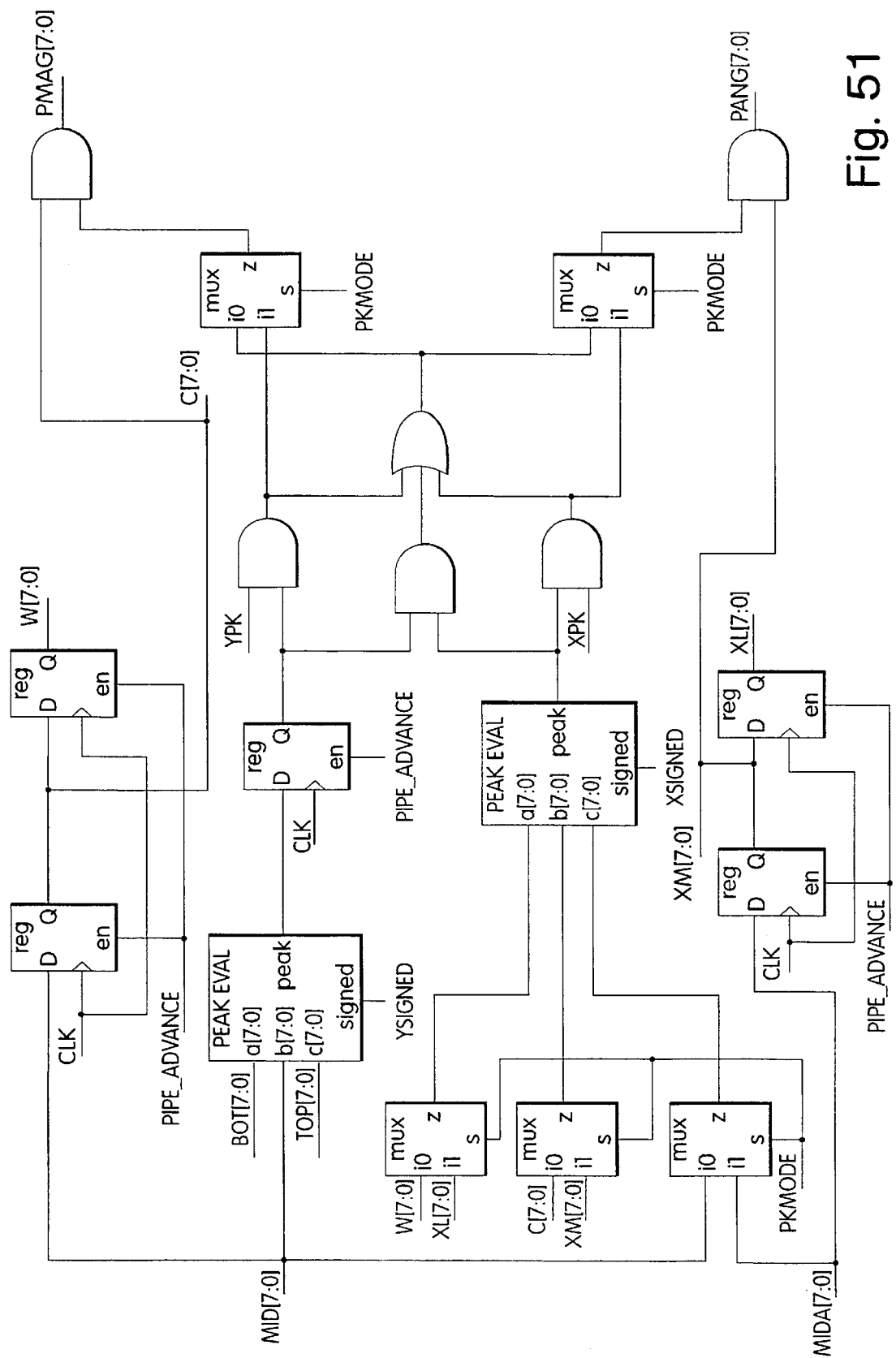
FIG. 51 is a schematic of the peak detector block of the coprocessor.

A Peak Eval logic element (see FIG. 51) implements the following function:

```
if (signed)
{ peak =  ((b[6:0] > a[6:0]) || (b[7] != a[7])) &&
          ((b[6:0] >= c[6:0]) || (b[7] != c[7]))
}
else /* not signed */
{ peak = (b[7:0] > a[7:0]) && (b[7:0] >= c[7:0])
}
```

Figure 52:
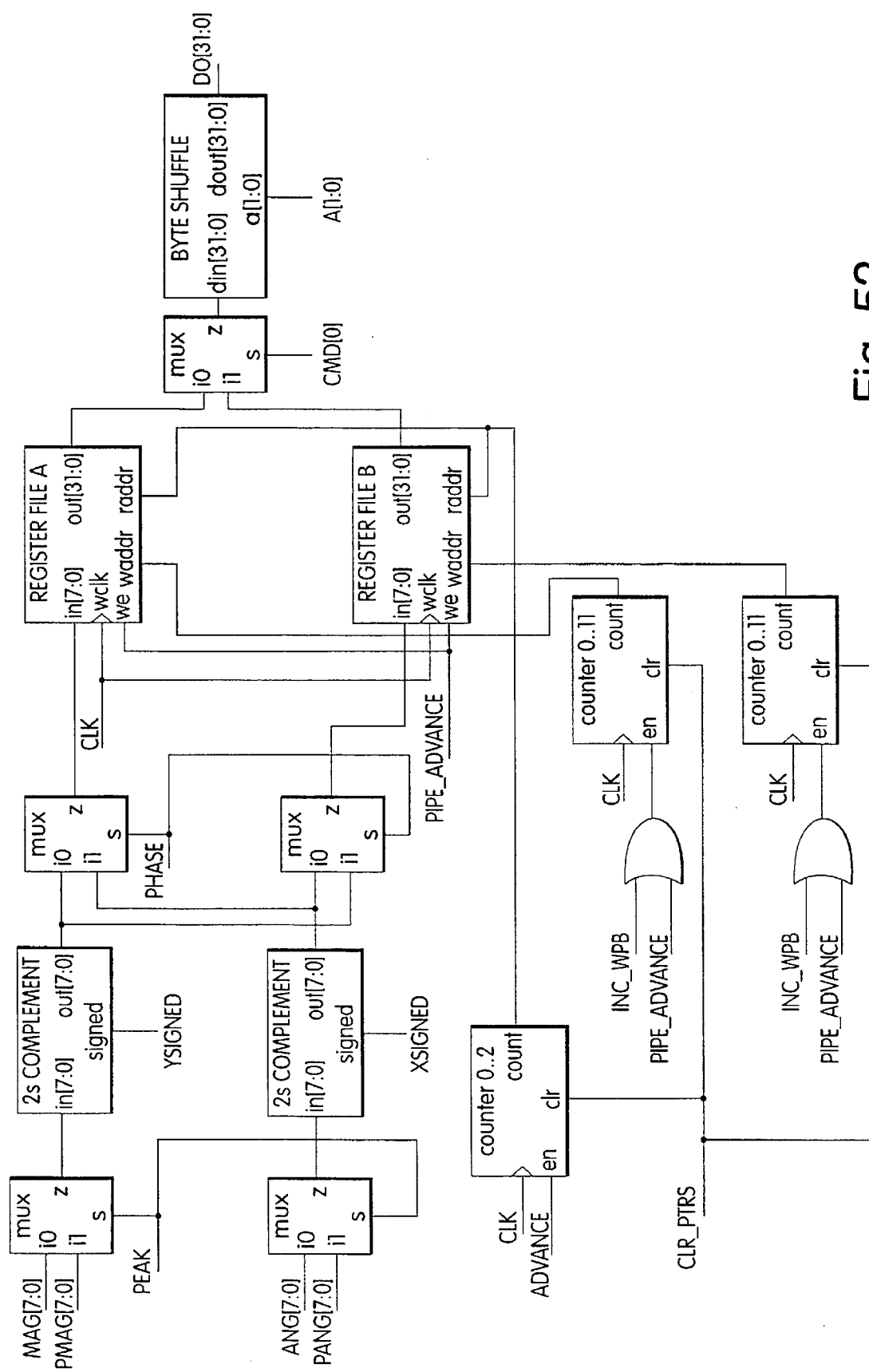
FIG. 52 is a schematic of the output block of the coprocessor.

In the Output block (see FIG. 52), a 2s Complement logic element operates as follows (assuming cardinality=8):

```
if (signed && in [7]) /* signed and negative? */
{    if (in [6:0] == 0) out[7:0] = 0;
     else out[7:0] = ~in[7:0] + 1;
}
else /* not signed, or signed but not negative */
{    out[7:0] = in[7:0]
}
```

A Register File contains 12 bytes of storage, arranged as three lines of four bytes; each line of 4 bytes is called a ring longword.

|            | 31:24 | 23:16 | 15:8 | 7:0  |
|------------|-------|-------|------|------|
| longword 0 | b0    | b1    | b2   | b3   |
| longword 1 | b4    | b5    | b6   | b7   |
| longword 2 | b8    | b9    | b10  | b11  |

If the we input is high during an active clock edge, the data at the in[7:0] input are written to one of the 12 bytes, identified by waddr. If we is low during an active clock edge, the in[7:0] and waddr inputs are ignored and the contents of the Register File do not change.

The out[31:0] output is driven with the contents of the ring longword identified by the raddr input. The table above shows which Register File bytes drive the bytelanes of out[31:0].

A Byte Shuffle logic element's a[1:0] input controls how the four bytes of its din[31:0] input are transferred to its dout[31:0] output:

| a[1:0] | dout[31:24] | dout[23:16] | dout[15:8] | dout[7:0] |
|--------|-------------|-------------|------------|-----------|
| 0      | din[31:24]  | din[23:16]  | din[15:8]  | din[7:0]  |
| 1      | din[23:16]  | din[23:16]  | din[15:8]  | din[7:0]  |
| 2      | din[15:8]   | din[7:0]    | din[15:8]  | din[7:0]  |
| 2      | din[7:0]    | din[7:0]    | din[15:8]  | din[7:0]  |

A preferred embodiment having been described, other variations will occur to those skilled in the art and are intended to fall within the scope of the invention, as set forth in the following claims.

We claim:

1. A digital image processing system including
   A. bus means for carrying control, data and address signals,
   B. memory means, coupled to said bus means, for storing digital image data and for responding to access control signals on said bus means for transferring digital image data therewith,
   C. CPU means, coupled to said bus means, for applying said access control signals thereto for controlling the transfer of digital image data therewith, said CPU means including address means for applying address signals to the bus means, in connection with said access control signals, to locate data being transferred therewith,
   D. video input means, coupled to said memory means, for acquiring digital image data and for storing said digital image data in said memory means, and
   E. image data co-processing means, coupled to said bus means, for responding to said control and address signals on said bus means for processing digital image data received therefrom,
   F. said address means including means for applying an address signal from a first selected set of address signals to the bus means in connection with an access control signal,
   said memory means including means for responding to that address signal for transferring data in accord with that access control signal,
   said image data co-processing means including means for responding to that address signal for ignoring data transfer with said bus means, and
   G. said address means includes means for applying an address signal from a second selected set of address signals to the bus means in connection with an access control signal,
   said image data co-processing means including means for responding to that address signal for transferring digital image data to said bus means,
   said memory means including means for responding to that address signal for transferring data from said bus means for storage therein.

2. In a system according to claim 1, the further improvement wherein said image data co-processing means includes
   A. at least one neighborhood processor for processing an input array of digital image data words to generate an output array of digital image data words, wherein said input array of digital image data words is no larger in a first principal dimension than NW pixels, and no larger in a second principal dimension, normal to the first, than NH pixels, where NW is no larger than an image width, IW, where NW, NH and IW are integers greater than or equal to one,
   B. said neighborhood processor including means for generating a word of said output array corresponding to each respective word of said input array, and
   C. said neighborhood processor further including means for generating each such word of said output array based on values of words in a neighborhood of the respective word of said input array, wherein said neighborhood comprises a plurality of digital image words corresponding to adjacent pixels in the corresponding acquired digital image data.

3. In a system according to claim 2, the further improvement wherein said image data co-processing means includes
   A. buffer memory means for storing digital image words in an array of NH rows of IW columns;
   B. control circuits for storing into said buffer memory means one or more input digital image data words and for simultaneously retrieving therefrom a neighborhood of NW by NH digital image data words; and
   C. computational elements for computing, from said neighborhoods, one or more output digital image data words representing at least a portion of said enhanced digital image data.

4. In a system according to any of claims 2 or 3, the further improvement wherein said neighborhood processor includes rank value filter means comprising:
   A. input means for inputting a neighborhood of digital image data words, each said candidate digital image data word comprising a plurality of bits, from most significant to least significant bits,
   B. storage means for at least initially storing a predetermined rank of word to be selected from said plurality of candidate digital image data words,
   C. mask means for storing a mask associated with each of said input digital image data words, each said mask being at least initially set to identify input words as candidate, D. iterative ranking means, coupled with said input, storage and mask means, for iteratively testing bits of the same significance from all of the candidate digital image data words, and generating a corresponding bit portion of a resultant digital word of the desired rank, and E. means for generating said resultant digital word as representative of said predetermined rank.

5. In a system according to any of claims 2 or 3, the further improvement wherein said neighborhood processor includes grey scale morphology means comprising:

A. preprocessor means coupled to said input means for performing a selected mathematical function on an input neighborhood of digital image words to form a preprocessed neighborhood of digital image words, B. rank value filter means coupled with said preprocessor means for selecting from said preprocessed neighborhood of digital image words a digital word of predetermined rank, C. said rank value filter means including
  (i) mask means for storing a mask associated with each of said preprocessed neighborhood of digital image data words, each said mask being at least initially set to identify input words as candidates,
  (ii) iterative ranking means, coupled with said input, storage and mask means, for iteratively testing bits of the same significance from all of said candidates, and generating a corresponding bit portion of a resultant digital word of the desired rank, and
  (iii) means for generating said resultant digital word as representative of said predetermined rank, and D. means coupled with said rank value filter means for generating said selected digital value as representative of one or more values in said input neighborhood of digital values.

6. A digital image processing system comprising

A. image source means generating digital image data representative of one or more images, B. image data co-processing means, coupled to said image source means, for processing digital image data received therefrom, and C. CPU means, coupled to said image source means and to said image data co-processing means, for generating and applying thereto signals to
  i) control the transfer of rows of digital image data from said image source means to said image data co-processing means, each said row comprising adjacent portions of an image along a first axis thereof, said transferred rows being any of (a) successive rows of a single image adjacent along a second axis, and (b) single corresponding rows of successive images, and
  ii) control the processing of said transferred rows by said image data co-processing means, D. said image data co-processing means comprising
  i) input means for inputting said rows of said digital image data,
  ii) row delay means, coupled to said input means, for accumulating said rows digital image data, said accumulated rows being any of (a) said successive rows of a single image adjacent along a second axis, and (b) said single corresponding rows of successive images,
  iii) neighborhood processing means, coupled to said row delay means, for responding to control signals received from said CPU means to selectively process successive rows of a single image received therefrom, and
  iv) row processing means, coupled to said row delay means, for responding to control signals received from said CPU means to selectively process said single corresponding rows of successive images.

7. A digital image processing system comprising

A. bus means for carrying control and data and address signals,

B. image source means, coupled with said bus means, for generating digital image data representative of one or more images and for transferring that data with said bus means, C. image data co-processing means, coupled to said bus means, for processing digital image data received therefrom, D. CPU means, coupled to said bus means, for generating and applying thereto signals to
  i) control the transfer of rows of digital image data from said image source means to said bus means, each said row comprising adjacent portions of an image along a first axis thereof, said transferred rows being any of (a) successive rows of a single image adjacent along a second axis; and (b) single corresponding rows of successive images,
  ii) control the processing of said transferred rows by said image data co-processing means, E. said image data co-processing means comprising
  i) input means, coupled to said bus means, for inputting said rows of said digital image data,
  ii) row delay means, coupled to said input means, for accumulating said rows of digital image data, said accumulated rows being any of (a) said successive rows of a single image adjacent along a second axis, and (b) said single corresponding rows of successive images,
  iii) neighborhood processing means, coupled to said row delay means, for responding to said control signals to selectively process successive rows of a single image received therefrom,
  iv) row processing means, coupled to said row delay means, for responding to control signals received from said CPU means to selectively process said single rows of corresponding successive images, and
  v) means, coupled to said neighborhood processing means and said row processing means, for selectively transferring processed image data to said bus means.

8. A digital image processing system according to claims 6 or 7, wherein said neighborhood processing means and said row processing means comprise reconfigurable processing means selectively actuable in response to control signals received from said CPU means for (i) processing successive rows of a single image received therefrom, and (ii) processing said single corresponding rows of successive images.

9. A digital image processing apparatus comprising:

A. a programmable computational element;

B. a random access memory;

C. a bus for carrying address, data, and control signals, that connects said computational element to said memory for the purpose of transferring data between them under control of said computational element;

D. input circuits capable of acquiring one or more digital input images and storing said input images in said memory;

E. a pixel processor operatively connected to said bus, having:

i) extracting means for extracting an input pixel stream, corresponding to one or more input images, from selected bus transactions that are specially marked by at least one of selected address and control signals reserved for that purpose;

ii) performing means for performing some computation on said input pixel stream to produce one or more first output pixel streams, corresponding to one or more output images, wherein each output value is some function of one or more input values; and iii) inserting means for inserting said one or more first output pixel streams into selected computational element-to-memory bus transactions that are specially marked by at least one of selected address and control signals reserved for that purpose, and in such a way that the memory stores the data supplied by the pixel processor, and F. said computational element having means to generate the said selected bus transactions with the said specially marked address and control signals.

10. An apparatus according to claim 9 where said pixel processor includes a first neighborhood processor, wherein:

A. the input image is no longer in a first principal dimension than IW pixels;

B. each pixel of each output image is computed based on the values of the input pixels that lie within a neighborhood corresponding to the position of the output pixel, that is no larger in a first principal dimension than NW pixels, and that is no larger in a second principal dimension, normal to said first principal dimension, than NH pixels, where NW and NH are integers greater than or equal to one;

C. the first neighborhood processor contains a buffer memory configured for storing digital image words in an array of NH rows of IW columns, where IW is an integer greater than or equal to one;

D. the first neighborhood processor contains control circuits that store the input pixel stream into the buffer memory and simultaneously read out from the buffer memory successive neighborhoods;

E. the first neighborhood processor contains computational elements that compute one or more second output pixel streams from said neighborhoods of input pixel values;

F. said computational element having means for generating bus transactions of a type and in a sequence appropriate for neighborhood processing.

11. An apparatus according to claim 9 where the pixel processor contains a first row processor, wherein:

A. one or more input images are processed;

B. the input images have the same first principal dimension;

C. the input images are no larger in a first principal dimension than IW pixels;

D. each pixel of each output image is computed based on a set of pixel values, where said set contains one pixel from each of the input images corresponding to the position of the output pixel and where the number of input images is no larger than NH;

E. the first row processor contains control circuits that store the input pixel stream into the buffer memory and simultaneously read out from the buffer memory successive sets of input pixels;

F. the first row processor contains control circuits that store the input pixel stream into the buffer memory and simultaneously read out from the buffer memory successive sets of input pixels;

G. the first row processor contains computational elements that compute one or more second output pixel streams from said sets of input pixel values;

H. said computational element having means for generating bus transactions of a type and in a sequence appropriate for row processing of one or more images.

12. An apparatus according to claim 10 or 11 wherein said first neighborhood processor or said row processor include means for processing input images which are wider than IW in said first principal dimension, by processing those images, in strips no larger in the first principal dimension than IW pixels.

13. An apparatus according to claim 10 wherein:

A. the pixel processor contains a second neighborhood processor, comprising a buffer memory, control circuits and computational elements similar in form to the first neighborhood processor;

B. said second neighborhood processor reads one of the third output pixel streams from the formatter;

C. said second neighborhood processor produces one or more fourth output pixel streams that are derived as some function of one or more of the third output pixel streams and the second neighborhood results;

D. the first output pixel streams can be a selected subset of the fourth output pixel streams.

14. An apparatus according to claim 10 wherein the computational elements of the first neighborhood processor are configured as a pixel rank processor, wherein:

A. pixels from said neighborhood are ranked in value, said value being minimum, maximum, median or other selected value, and B. two second output pixel streams are produced, the first representing the selected rank value and the second indicating which pixel or pixels in the neighborhood contain that rank value.

15. An apparatus according to claim 11 wherein the computational elements of the first row processor are configured as a pixel rank processor, wherein:

A. multiple input images are processed;

B. corresponding pixels from said multiple input images are ranked;

C. two second output pixel streams are produced, one representing the selected ranking pixel's value, said selected value being minimum, maximum, median or other selected value, and the other indicating which image or images contained the ranking pixel's value.

16. An apparatus according to claim 10 wherein the computational elements of the first neighborhood processor are configured for Sobel cartesian gradient computation, producing two second output pixel streams containing intensity gradient components in each principal dimension.

17. An apparatus according to claim 10 wherein the computational elements of the first neighborhood processor are configured for Sobel polar gradient computation, producing two second output pixel streams containing intensity gradient magnitude and direction.

18. An apparatus according to claim 17 wherein said two second output pixel streams correspond to gradient magnitude and direction pairs, with the improvement wherein if the gradient magnitude of any pair does not exceed some predetermined threshold value, then both members of the pair are set to some reserved value not otherwise used to represent magnitude and direction.

19. An apparatus according to claim 10 wherein the computational elements of the first neighborhood processor are configured for gauss/laplace, producing two second output pixel streams, one containing a gaussian filtration of the input image and the other containing a laplacian filtration of the input image.

20. An apparatus according to claim 11 wherein the computational elements of the first row processor are configured for summation of two input pixel streams, producing a second output pixel stream containing the sum of said two input streams.

21. An apparatus according to claim 11 wherein the computational elements of the first row processors are configured for subtraction of corresponding pixels of two output streams, producing one second output pixel stream containing the difference of the two input pixel streams.

22. An apparatus according to claim 11 wherein the computational elements of the first row processor are configured to compute a Golden Template Comparison (GTC) function of three input streams, producing one second output pixel stream containing a GTC function value resulting from such computation.

23. An apparatus according to claim 10 or 11 where the pixel processor includes a formatter, wherein
  A. the formatter produces one or more third output pixel streams that are derived as some function of one or more of the second output pixel streams,
  B. the first output pixel streams can be a selected subset of the third output pixel stream,
  C. whether the absolute value of the selected second pixel stream values is computed is selectable,
  D. absolute value, if selected, is applied to all second pixel streams,
  E. each second pixel stream, as modified by said selectable absolute value step, is divided by an independently selectable power of two,
  F. each second pixel stream, as modified by said selectable absolute value step and further modified by said independently selectable division by a power of two, is processed according to an independently selectable saturation rule, to produce corresponding third pixel stream values.

24. An apparatus according to claim 13 wherein said second neighborhood processor is configured for peak detection.

25. An apparatus according to claim 13 wherein said second neighborhood processor is configured for peak detection and two fourth output pixel streams are produced, similar to the said selected second or third output pixel streams,
  with the improvement wherein for any magnitude/direction pixel pair where the magnitude value is not a peak value according to one of four selectable criteria: the magnitude value is a peak in the first principal dimension, the magnitude value is a peak in the second principal dimension, the magnitude value is a peak in either the first or the second principal dimension, or the magnitude value is a peak in both the first and the second principal dimensions, then both members of the pair are set to some reserved value not otherwise used to represent magnitude and direction.

26. An apparatus according to claim 17 comprising a CORDIC circuit means for generating said magnitude and direction values as a function of the Sobel cartesian gradient components in each principal dimension.

27. An apparatus according to claim 9 wherein said input pixel stream is selectively mapped by means of a lookup table before taking part in any computation.

28. An apparatus according to claim 9 wherein said computational element can store one or more computed images in said memory, such that a computed image can be substituted for an input image.

29. An apparatus according to claim 9 wherein said programmable computational element, random access memory, and data bus are of sufficient bit width so that more than one pixel can be transferred in one bus data transfer cycle, wherein:
  A. said pixel processing element is capable of extracting an input pixel stream from bus transactions of width greater than 1 pixel;
  B. said pixel processing element is capable of storing said first output pixel streams into memory using bus transactions of width greater than 1 pixel;
  C. said computational element having means to minimize the number of bus transactions necessary to process images using said pixel processing element, by using multi-pixel bus transactions of the greatest possible width whenever possible.

30. A method for processing digital image data in a system of the type having
  a bus for carrying control, data and address signals,
  a memory coupled to said bus, for storing digital image data and for responding to access control signals on said bus for transferring digital image data therewith,
  a video input, coupled to said bus, for acquiring digital image data and for responding to access control signals on said bus for transferring digital image data thereto,
  an image data coprocessor, coupled to said bus, for responding to access control signals on said bus for processing digital image data received therefrom for enhancement thereof,
  a CPU, coupled to said bus, for applying said access control signals to the bus for controlling said transfer of digital image data with said bus, said CPU including an address element for applying address signals to the bus, in connection with said access control signals, to locate data being transferred in connection therewith,
the method comprising:
  A. signalling, when certain preselected image data from said memory is on said bus, that the data be written to the coprocessor,
  B. providing for processing of the image data by the coprocessor, and
  C. at a preselected time later, signalling that image data output from said coprocessor be written to the memory means.

31. A method according to claim 30 wherein said step of providing for processing of the image data includes:
  A. processing an input array of digital image words by a neighborhood processor to generate an output array of digital image words, wherein the input array of digital image words is no larger in a first principal dimension than NW pixels, and no larger in a second principal dimension, normal to the first, than NH pixels, where NW is no larger than an image width, IW, where NW, NH and IW are integers greater than or equal to one,
  B. said processing including generating a word of the output array corresponding to each respective word of the input array, and
  C. said processing further including generating each such word of said output array based on values of words in a neighborhood of the respective word of said input array, wherein said neighborhood comprises a plurality of digital image words corresponding to adjacent pixels in the corresponding acquired digital image data.

32. A method according to claim 31, including
   A. providing buffer memory for storing digital image words in an array of NH rows of IW columns;
   B. storing into said buffer memory one or more input digital image data words and simultaneously retrieving therefrom a neighborhood of NW by NH digital image words;
   C. computing from said neighborhoods, one or more output digital image words representing at least a portion of said enhanced digital image data.

33. A method according to claims 31 or 32, including rank value filtering comprising:
   A. inputting a neighborhood of digital image words, each said candidate digital image data word comprising a plurality of bits, from most significant to least significant bits,
   B. initially storing a predetermined rank of word to be selected from said plurality of candidate digital image data words,
   C. storing a mask associated with each of said input digital image data words, each said mask being at least initially set to identify input words as candidates,
   D. iteratively testing bits of the same significance from all of the candidate digital image data words, and generating a corresponding bit portion of a resultant digital word of the desired rank, and
   E. generating said resultant digital word as representative of said predetermined rank.

34. A method according to claims 31 and 32, including gray scale morphology steps including:
   A. performing a preprocessing selected mathematical function on an input neighborhood of digital image words to form a preprocessed neighborhood of digital image words,
   B. performing rank value filtering for selecting from said preprocessed neighborhood of digital image words a digital word of predetermined rank,
   C. said rank value filtering step including:
      (i) storing a mask associated with each of said digital image data words, each said mask being at least initially set to identify input words as candidates,
      (ii) iteratively testing bits of the same significance from all of the candidate digital image data words, and generating a corresponding bit portion of a resultant digital word of the desired range, and
      (iii) generating said resultant digital word as representative of said predetermined rank, and
   D. generating said selected digital value as representative of one or more values in said input neighborhood of digital values.

35. A method for digital image processing in a system comprising
   image source means generating digital image data representative of one or more images,
   image data co-processing means, coupled to said image source means, for processing digital image data received therefrom,
   CPU means, coupled to said image source means to said image data co-processing means, for generating and applying thereto control signals to
      i) control the transfer of rows of digital image data from said image source means to said image data co-processing means, each said row comprising adjacent portions of an image along a first axis thereof, said transferred rows being any of (a) successive rows of a single image adjacent along a second axis, and (b) single corresponding rows of successive images,
      ii) control the processing of said transferred rows by said image data co-processing means,
   the method comprising
      A. inputting said rows of said digital image data,
      B. accumulating said rows of digital image data, said accumulated rows being any of (a) said successive rows of a single image adjacent along a second axis, and (b) said single corresponding rows of successive images,
      C. selectively responding to said control signals to selectively process successive rows of a single image received therefrom,
      D. selectively responding to control signals received from said CPU means to selectively process said single corresponding rows of successive images.

36. A method according to claim 35, including providing reconfigurable processing means selectively actuable in response to control signals received from said CPU means for (i) processing successive rows of a single image received therefrom, and (ii) processing said single rows of successive images.

* * * * *